(12) United States Patent
Griffin et al.

(10) Patent No.: US 8,739,817 B2
(45) Date of Patent: Jun. 3, 2014

(54) DIVERTER AND LID ASSEMBLY FOR USE WITH A RAIN BARREL DEVICE AND SYSTEM

(75) Inventors: Scott Griffin, Pickerington, OH (US); David M. Coventry, Dublin, OH (US); David Fischer, Dublin, OH (US); Doug Reeves, Wallingford, KY (US); Kerri Love, Columbus, OH (US); Joshua Michael Broehl, Worthington, OH (US); Edwin Beck, Delaware, OH (US); Martin Beck, Delaware, OH (US); Arthur Wells, Auburn, GA (US); Bruce J. Geever, Darien, IL (US)

(73) Assignee: Earth Minded LLC

( * ) Notice: Subject to any disclaimer, the term of this patent is extended or adjusted under 35 U.S.C. 154(b) by 299 days.

(21) Appl. No.: 12/779,347

(22) Filed: May 13, 2010

(65) Prior Publication Data

US 2011/0005613 A1 Jan. 13, 2011

Related U.S. Application Data

(60) Provisional application No. 61/177,867, filed on May 13, 2009.

(51) Int. Cl.
*E04D 13/08* (2006.01)

(52) U.S. Cl.
USPC ............................................. 137/360; 52/16

(58) Field of Classification Search
USPC ........................................ 137/357, 360; 52/16
See application file for complete search history.

(56) References Cited

U.S. PATENT DOCUMENTS

| | | | | |
|---|---|---|---|---|
| 4,726,151 A * | 2/1988 | Vitale | ................................. | 52/16 |
| 5,533,303 A * | 7/1996 | Harvey | ............................. | 52/16 |
| 5,681,455 A * | 10/1997 | Takai et al. | .................... | 210/154 |
| 5,863,151 A * | 1/1999 | Chapotelle | ....................... | 405/52 |
| 6,619,312 B2 * | 9/2003 | Doiron | .......................... | 137/122 |
| 7,550,077 B2 * | 6/2009 | Graf | ................................ | 210/162 |
| 8,006,720 B1 * | 8/2011 | Kotansky | ...................... | 137/873 |
| 8,097,151 B2 * | 1/2012 | Allan | ............................. | 210/162 |
| 2006/0101723 A1 | 5/2006 | Baeta | | |
| 2006/0191938 A1 | 8/2006 | Zephir et al. | | |
| 2010/0193046 A1 * | 8/2010 | Moroder et al. | ............... | 137/357 |

* cited by examiner

*Primary Examiner* — William McCalister
(74) *Attorney, Agent, or Firm* — Baker & Hostetler LLP

(57) ABSTRACT

A diverter for a rain barrel includes a scoop portion configured to fit within a gutter downspout, a rain barrel fitting portion configured to fluidly attach the scoop portion to the rain barrel, and a wing extending outwardly from the scoop portion to direct a flow of water in the gutter downspout towards the scoop portion.

5 Claims, 32 Drawing Sheets

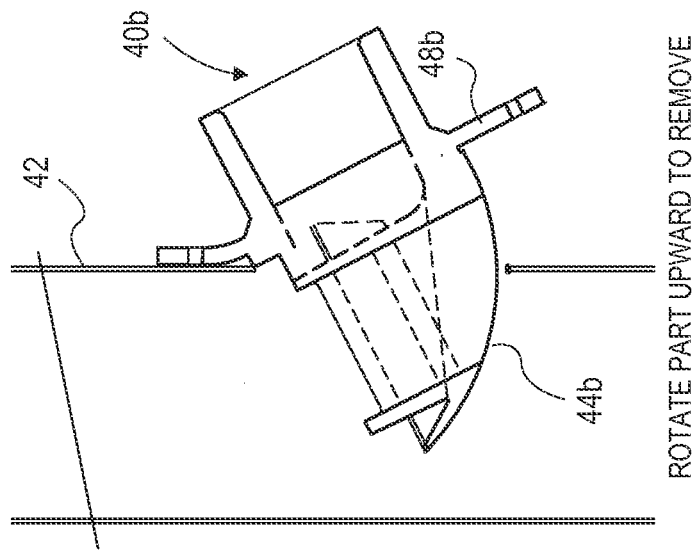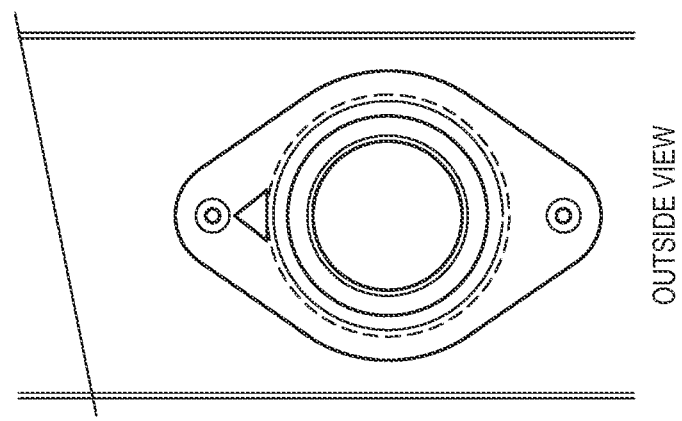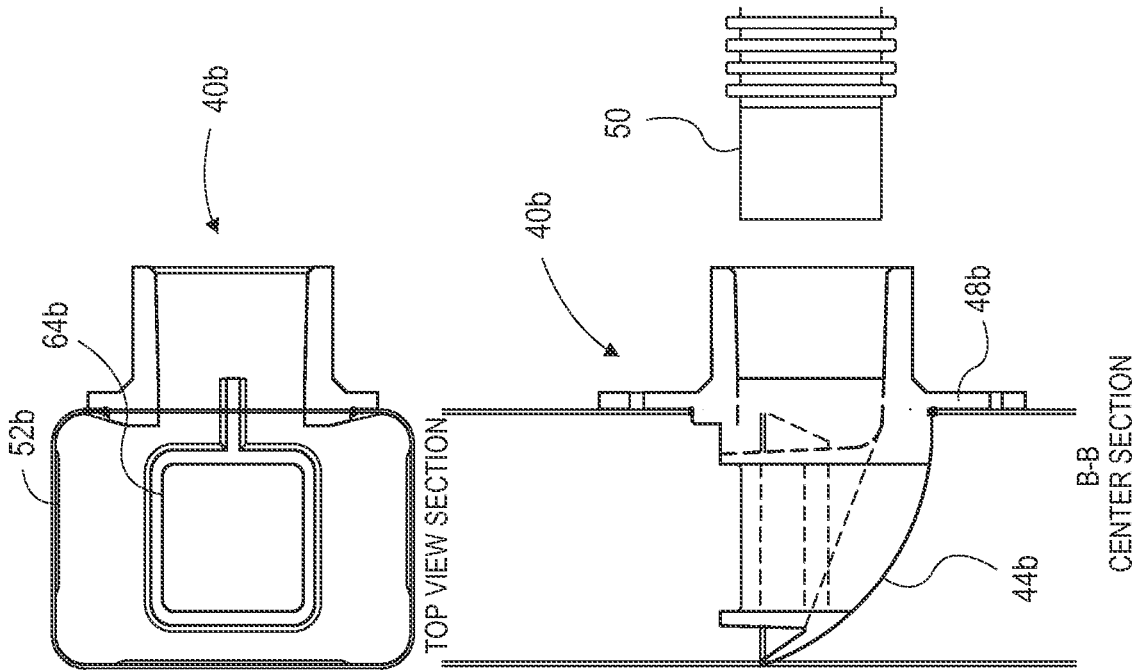
FIG. 13

SIDE VIEW

CROSS SECTION (SOWN WITH HOSE ATTACHED)

TOP VIEW (WING BENT TO FIT 2" X 3" DOWNSPOUT)

TOP VIEW (WING EXTENDED)

FRONT VIEW

SIDE VIEW

CROSS SECTION

TOP VIEW (SHOWN INSTALLED IN A 2" X 3" DPWNSPOUT)

INSIDE VIEW

FRONT (OUTSIDE) VIEW

DIVERTER AND LID ASSEMBLY FOR USE WITH A RAIN BARREL DEVICE AND SYSTEM

CROSS REFERENCE TO RELATED APPLICATION

This application claims priority to earlier filed U.S. Provisional Application No. 61/177,867, filed on May 13, 2009, the disclosure of which is hereby incorporated by reference, in its entirety.

FIELD OF THE INVENTION

The present invention relates generally to a rain barrel system. More particularly, the present invention relates to a diverter and lid assembly for use with rain barrel device and system.

BACKGROUND OF THE INVENTION

Climatic change caused by global warming has been implicated in an increase in drought conditions as well as the depletion of aquifers, ground water, and irrigation systems. Elevated temperatures contribute to the melting of fresh water reserves in glaciers and ice caps and cause these reserves to flow into the oceans—reducing fresh water available for human consumption. Increases to global population have drastically increased consumption of water. It has been estimated that by 2030, global population will double to 12 billion people—doubling present water consumption. In addition, runoff caused by development and urbanization has increased significantly which results in the pollution of rivers, streams, and oceans. Increased runoff further stresses present storm sewer and water treatment plants which may increase in the frequency and severity of flooding. It has been predicted that by 2025—in just 16 years—nearly ⅓ of the population will lack access to drinking water.

Practicing water conservation may reduce these and other negative consequences of water consumption. Rain catchment/storage systems can facilitate water conservation by storing water that would otherwise be fed into the storm drain system for use in watering lawns and other plantings. Conventionally, barrels may be connected to gutters or other such rain catchment systems. Unfortunately, these conventional rain barrels are typically re-purposed from other uses and lack particular features to be successfully employed as rain catchment devices. Furthermore, the connection from the rain catchment system to the rain barrel used in conventional rain catchment/storage systems fail to provide for specific needs of a rain catchment/storage system. Accordingly, it is desirable to provide for a rain catchment/storage system that is capable of overcoming the disadvantages described herein at least to some extent.

SUMMARY OF THE INVENTION

The foregoing needs are met, to a great extent, by the present invention, wherein in some embodiments a rain catchment/storage system with improved diverter and/or lid are provided.

An embodiment of the present invention relates to a diverter for a rain barrel. The diverter includes a scoop portion configured to fit within a gutter downspout, a rain barrel fitting portion configured to fluidly attach the scoop portion to the rain barrel, and a wing extending outwardly from the scoop portion to direct a flow of water in the gutter downspout towards the scoop portion.

Another embodiment of the present invention can include a wing having a pivotable configuration. The diverter can include a flange to facilitate securing the diverter to the gutter downspout. The diverter can also include a hose to fluidly couple the diverter to the rain barrel. Additionally, the wing can be made from a flexible material or alternately a material which can be cut to couple with the gutter downspout, and the wing can also be configured to fold in to couple with the downspout. The diverter can also include fasteners to couple the diverter to the downspout.

Another embodiment of the present invention pertains to a rain barrel. The rain barrel includes a barrel portion configured to retain water, a lid configured to releasably lock upon the barrel portion, and a diverter attachment cutout configured to receive a diverter. The diverter includes a scoop portion configured to fit within a gutter downspout, a rain barrel fitting portion configured to fluidly attach the scoop portion to the rain barrel, and a wing extending outwardly from the scoop portion to direct a flow of water in the gutter downspout towards the scoop portion.

Another embodiment of the present invention can include a diverter disposed near a top portion of the rain barrel. The lid can include a lock status indicator. Additionally, wherein the lid can include a tab portion and a rim of the rain barrel can include a slot portion. The tab portion of the lid can then be rotated into the slot portion of the rim to releasably lock the lid to the rain barrel.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 13 are views of the diverter according to the embodiment of FIG. 12.

DETAILED DESCRIPTION OF THE INVENTION

Figure 1:
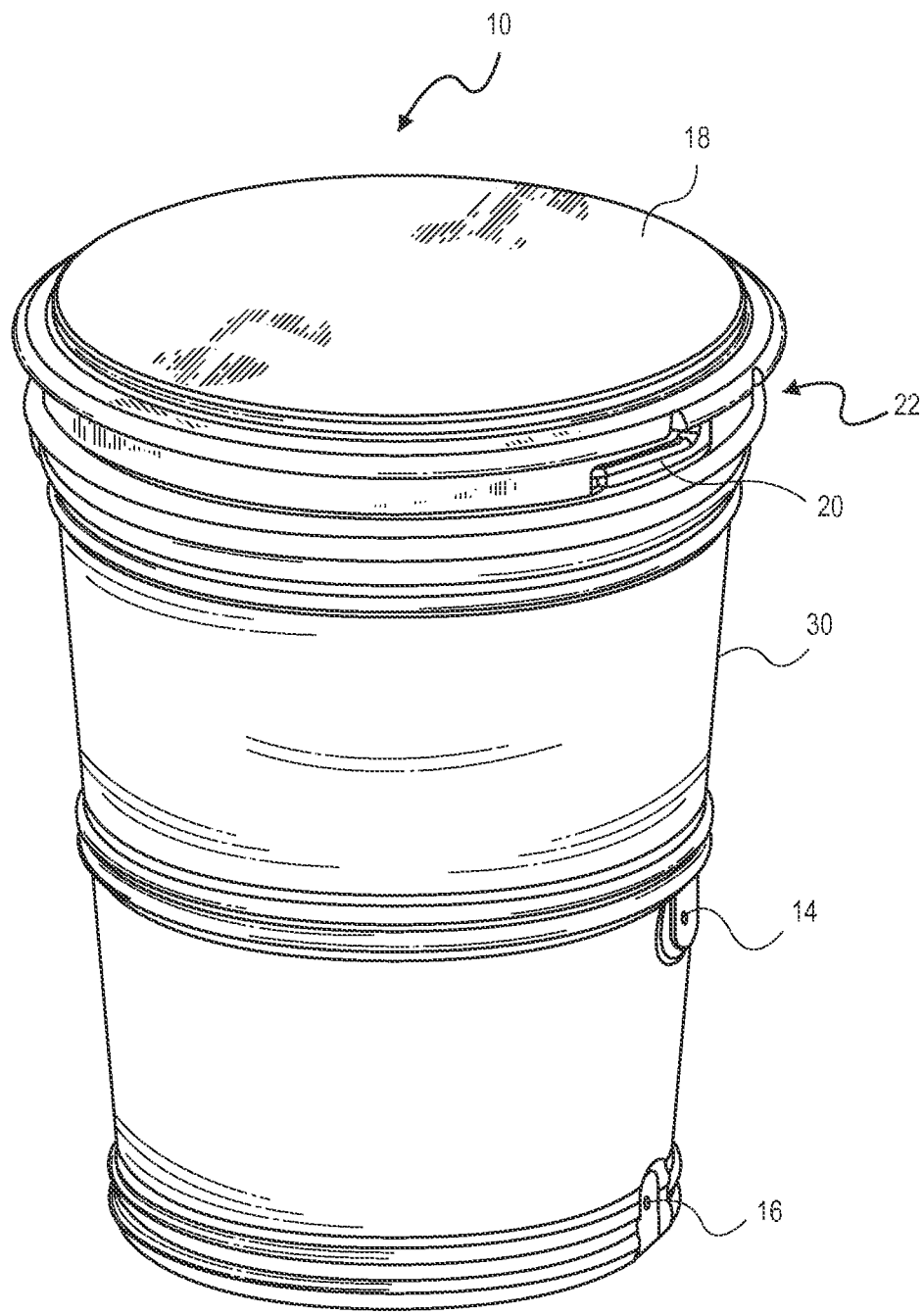
FIG. 1 is a perspective view of a rain barrel device according to an embodiment of the invention.
Figure 2:
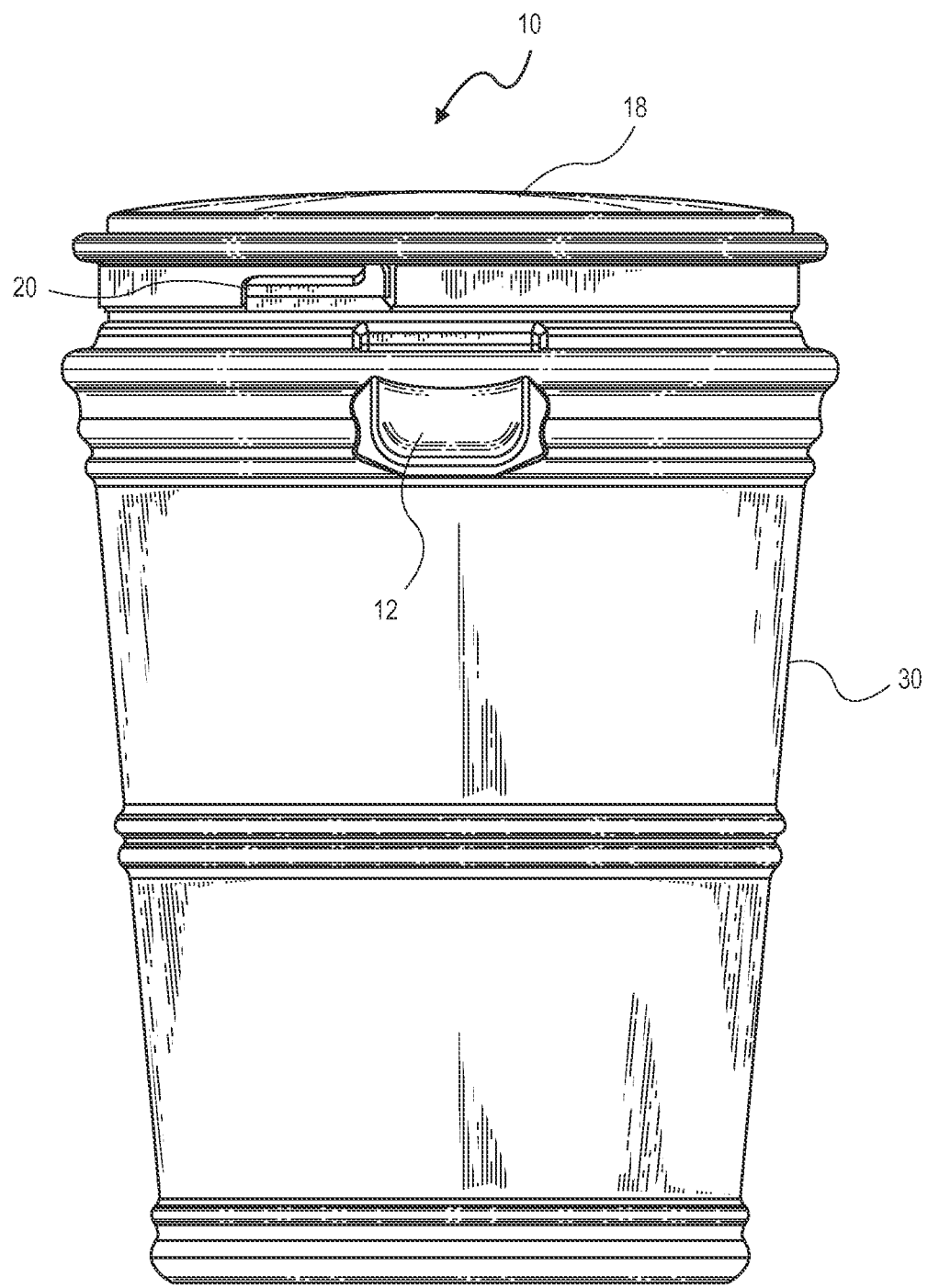
FIG. 2 is a back view of a rain barrel device according to the embodiment of FIG. 1.
Figure 3:
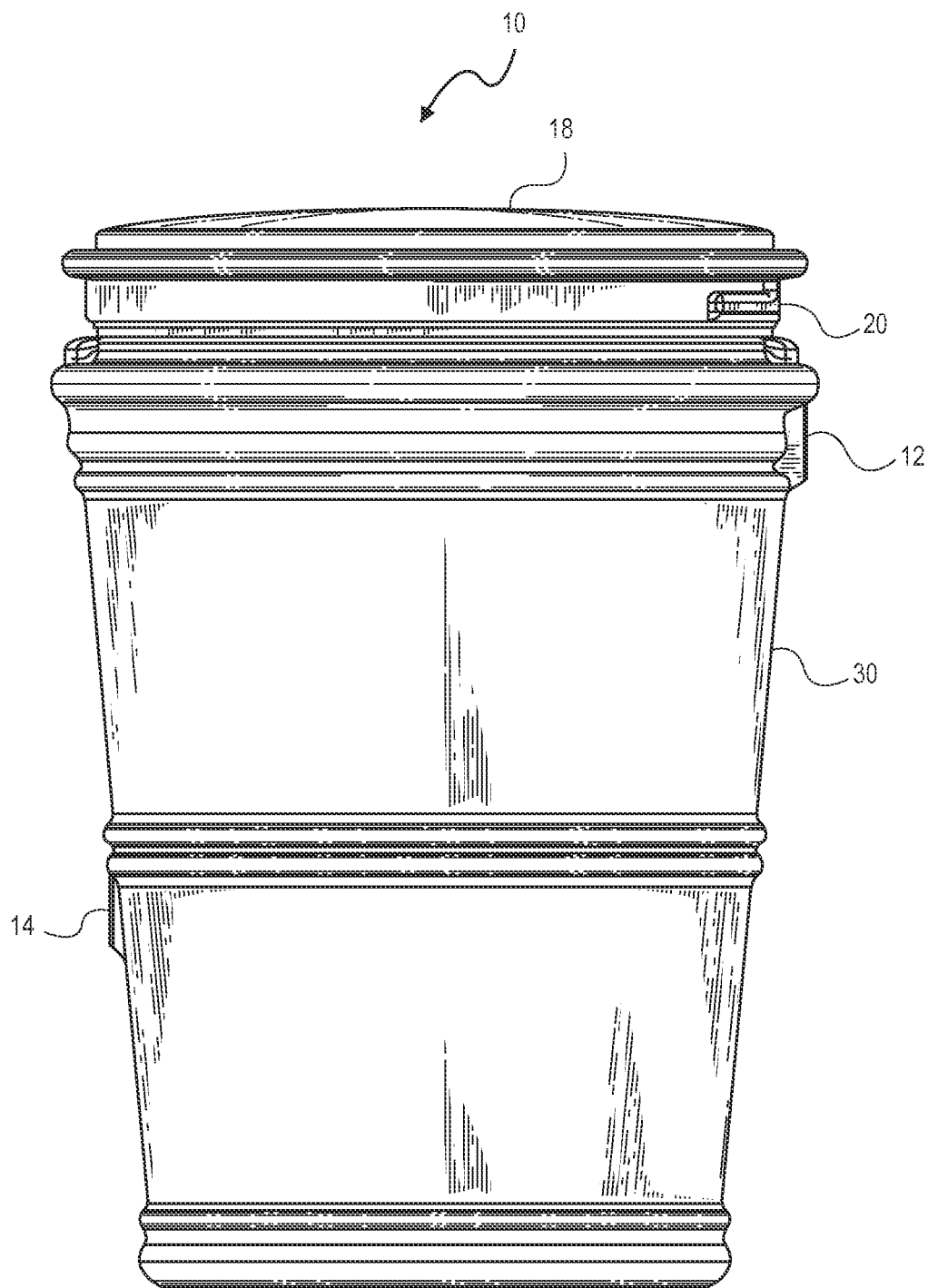
FIG. 3 is a side view of the rain barrel device according to the embodiment of FIG. 1.

The present invention provides, in some embodiments, a rain barrel rain collection system, diverter for use with the rain collection system, and lid for use with the rain collection system.

FIGS. 1-6 are views of a rain barrel 10 according to an embodiment of the invention. As shown in FIGS. 1-6, the rain barrel 10 includes a diverter attachment cutout 12, faucet attachment cutout 14, and hose/daisy chain attachment cutout 16. The rain barrel 10 further includes a lid 18 with a lock 20 and lock status indicator 22.

The diverter attachment cutout 12 is configured to receive a suitable water diverter such as described herein. In various embodiments, the diverter attachment cutout 12 may be scored, partially, or fully cut out, or removed. The diverter attachment cutout 12 is disposed relatively near a top of the rain barrel 10 to facilitate filling the rain barrel 10.

The faucet attachment cutout 14 is configured to receive a suitable conventional faucet. The faucet attachment cutout 14 may be disposed at or below a middle portion of the rain barrel 10 and preferably closer to a lower third of the rain barrel 10 to provide sufficient head of water to facilitate proper water flow. The faucet attachment cutout 14 may also be disposed at a sufficient height to allow for filling of a watering pitcher, for example.

Figure 4:
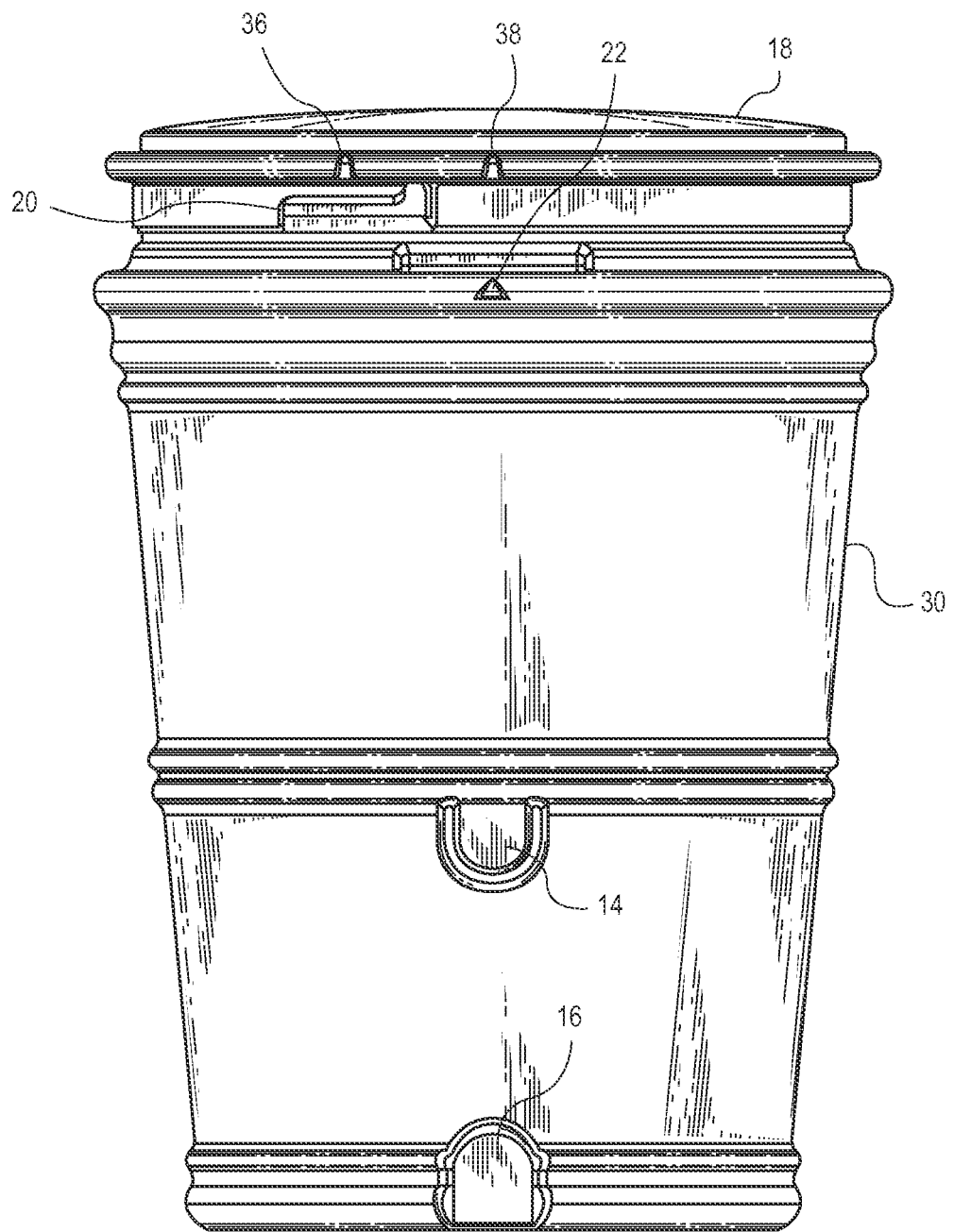
FIG. 4 is a front view of the rain barrel device according to the embodiment of FIG. 1.
Figure 5:
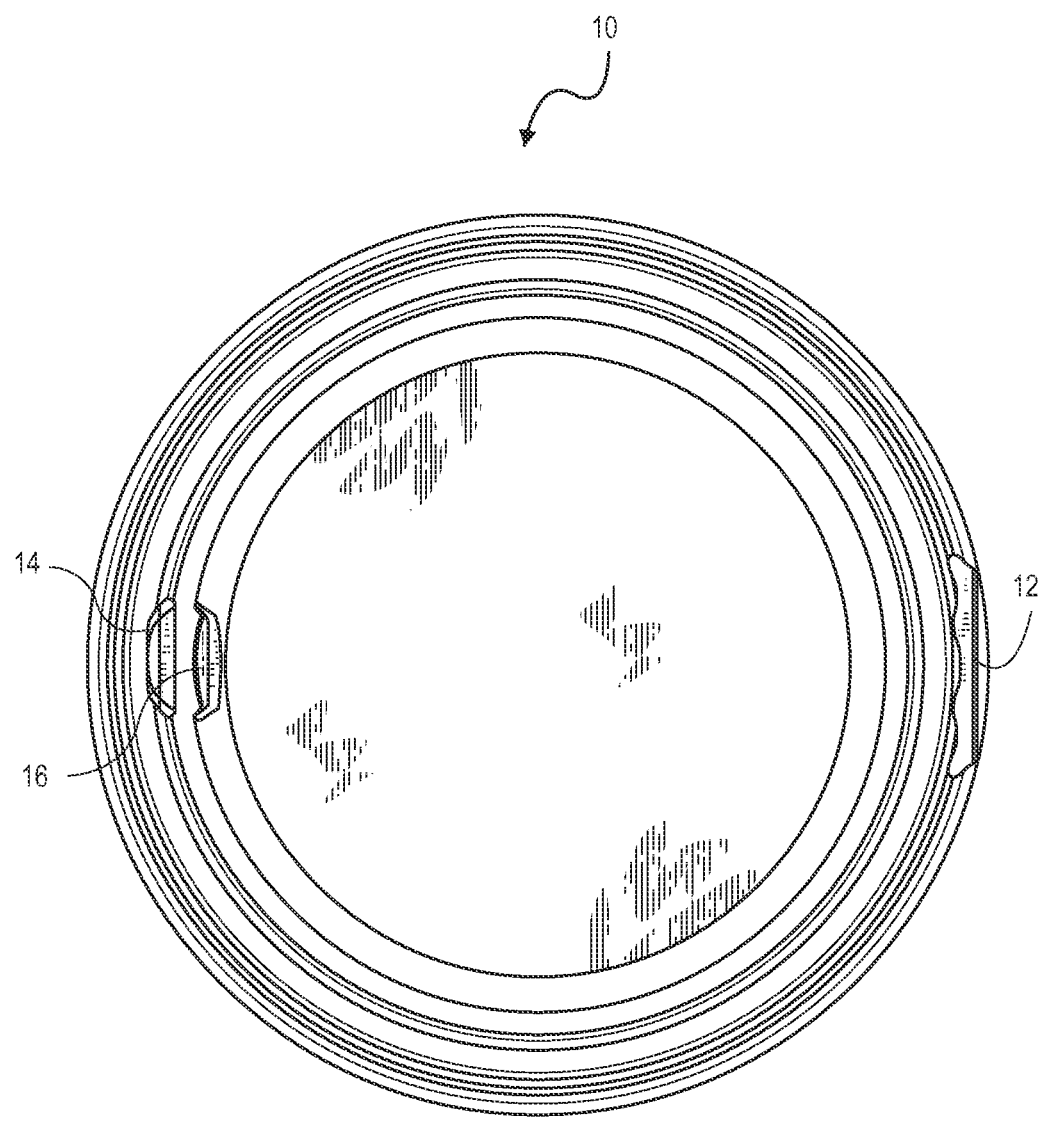
FIG. 5 is a bottom view of the rain barrel device according to the embodiment of FIG. 1.
Figure 6:
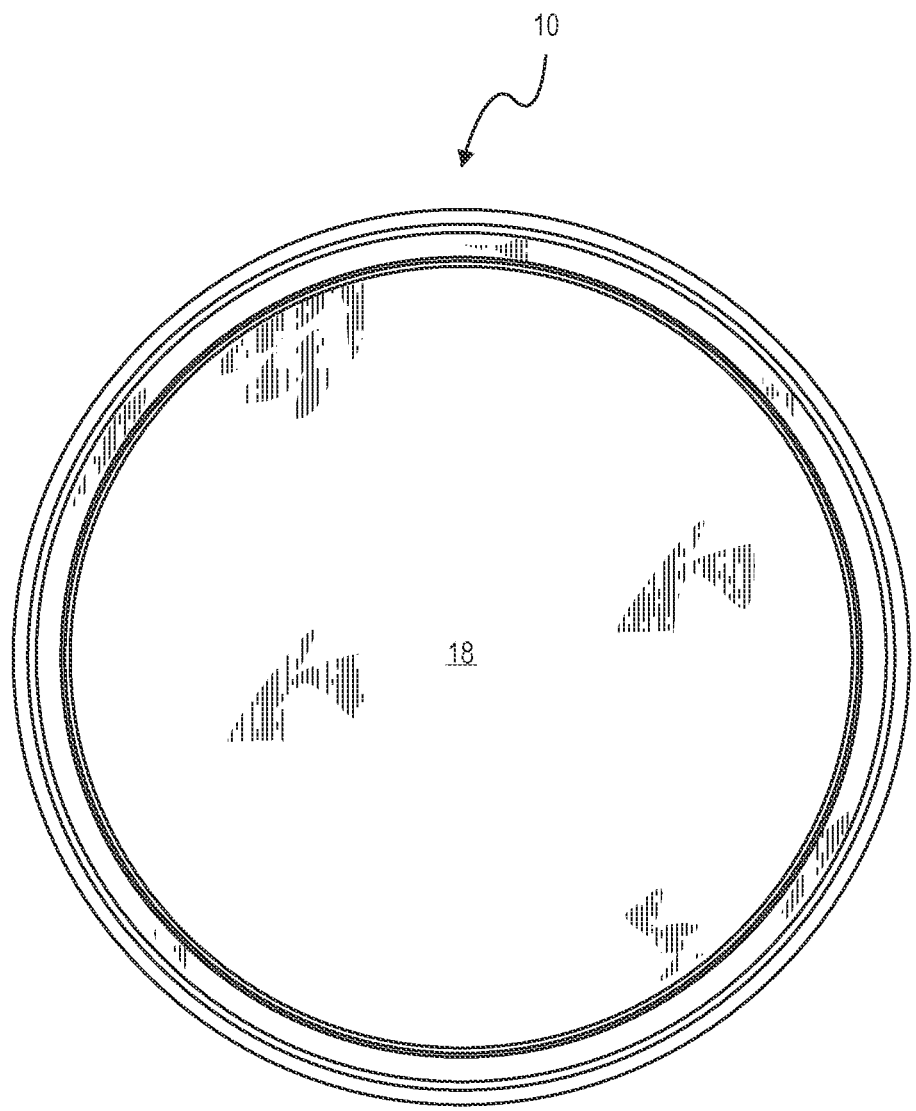
FIG. 6 is a top view of the rain barrel device according to the embodiment of FIG. 1.

The hose/daisy chain attachment cutout 16 is configured to receive a conventional hose to facilitate watering and/or to facilitate attaching the rain barrel 10 to another rain barrel 10 or other such rain collection device. As shown in FIG. 4, the lid 18 is disposed in the closed or locked position as indicated by the lock status indicator 22 being in alignment with a locked indicator 38. In response to the lid 18 being rotated to align the lock status indicator 22 with the unlocked indicator 36, the lid 18 would be disposed in the opened or unlocked position.

Figure 8:
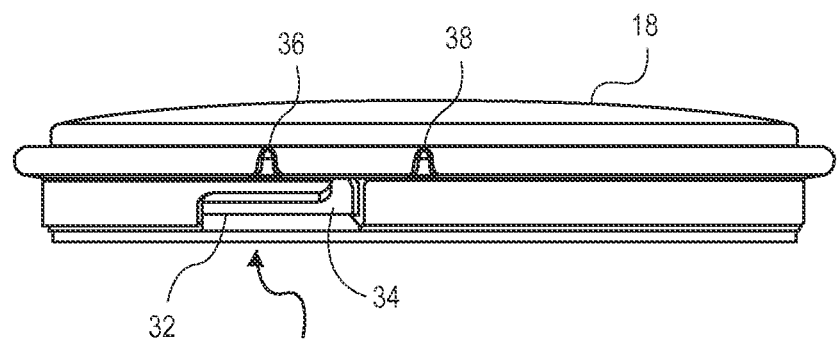
FIG. 8 is a more detailed view of a lid for the rain barrel device according to the embodiment of FIG. 1.
Figure 7:
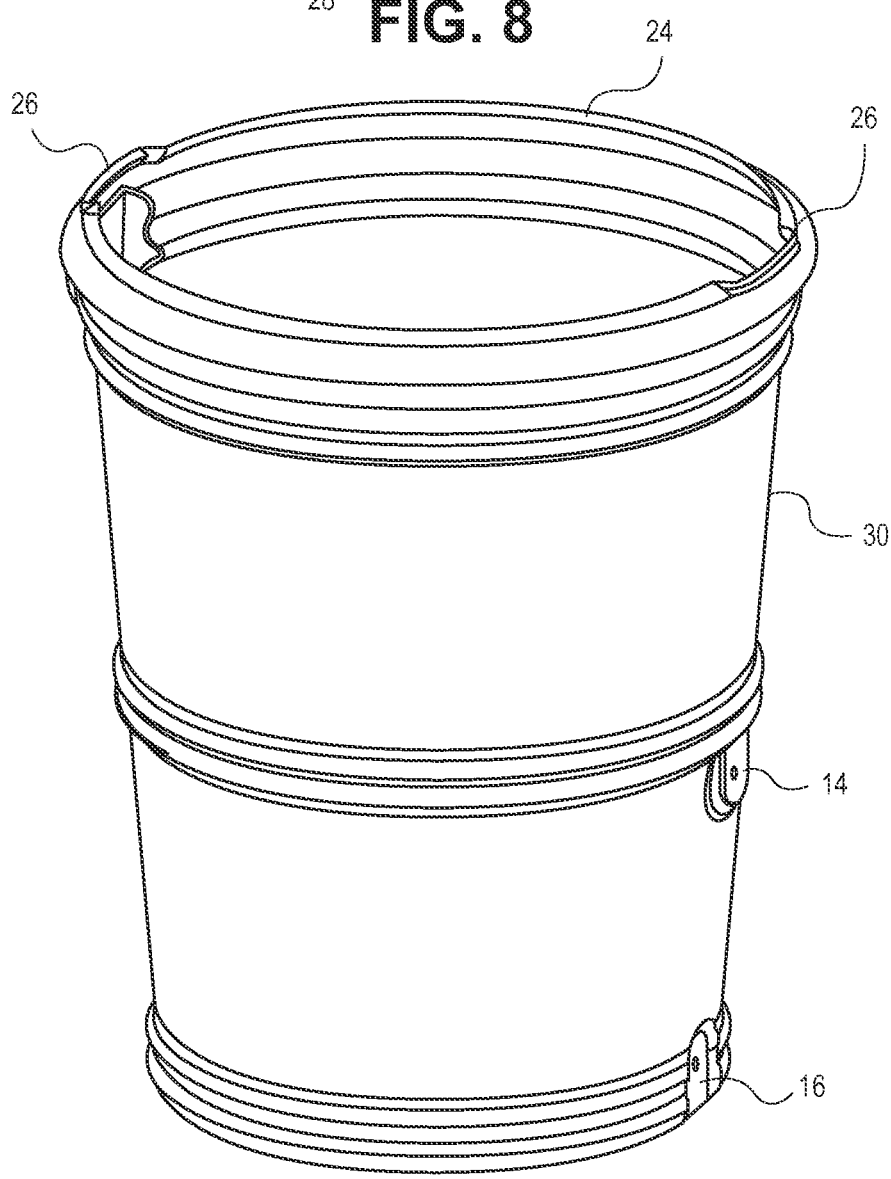
FIG. 7 is a perspective view of a barrel body according to the embodiment of FIG. 1.

FIGS. 7 and 8 are views of the barrel body 30 and lid 18 according to the embodiment of FIG. 1. As shown in FIGS. 7 and 8, the barrel body 30 includes a rim 24 with slot or lock portion 26. The lid 18 includes a tab or key portion 28. The lock portion 26 is configured to receive the key portion 28. The key portion 28 is configured to engage or mate with the lock portion 26 in response to the lid 18 being rotated relative to a barrel body 30. In this manner, the lid 18 may be releasably secured to the barrel body 30. As shown in FIG. 8, the key portion 28 includes a securing portion 32 configured to slide below the rim 24 to secure the lid 18 to the barrel body 30. The key portion 28 further includes a stop 34 configured to bare against the rim 24 to arrest further rotation of the lid 18 with respect to the barrel body 30. Optionally, the lid 18 includes an unlocked indication 36 and a locked indicator 38.

Figure 9:
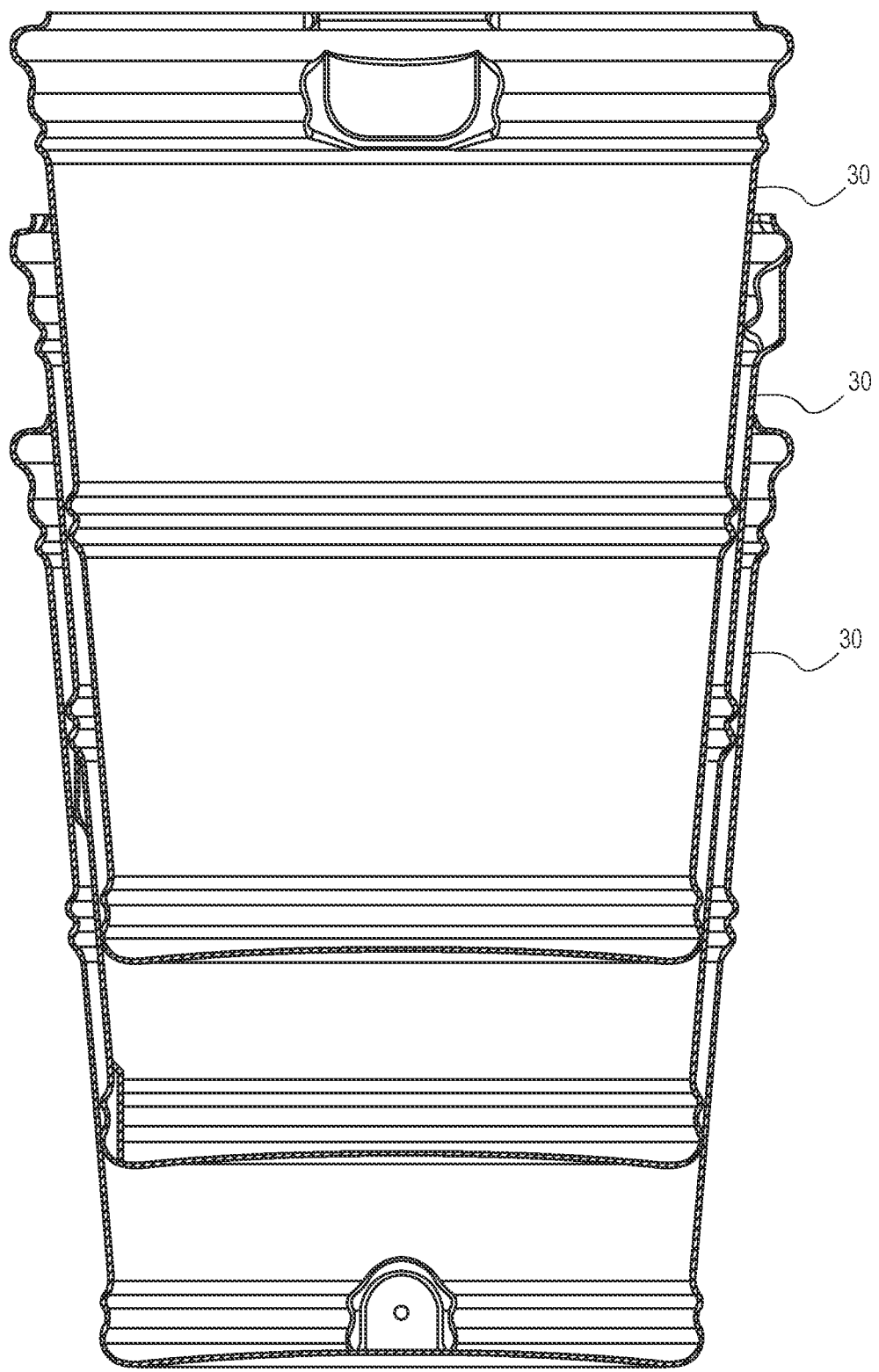
FIG. 9 is a cross-sectional view of a set of stacked rain barrels according to the embodiment of FIG. 1.

FIG. 9 is a cross-sectional view of a set of stacked rain barrels according to the embodiment of FIG. 1. As shown in FIG. 9, the barrel bodies 30 may be configured to stack to facilitate ease of storage and/or transport.

Figure 10:
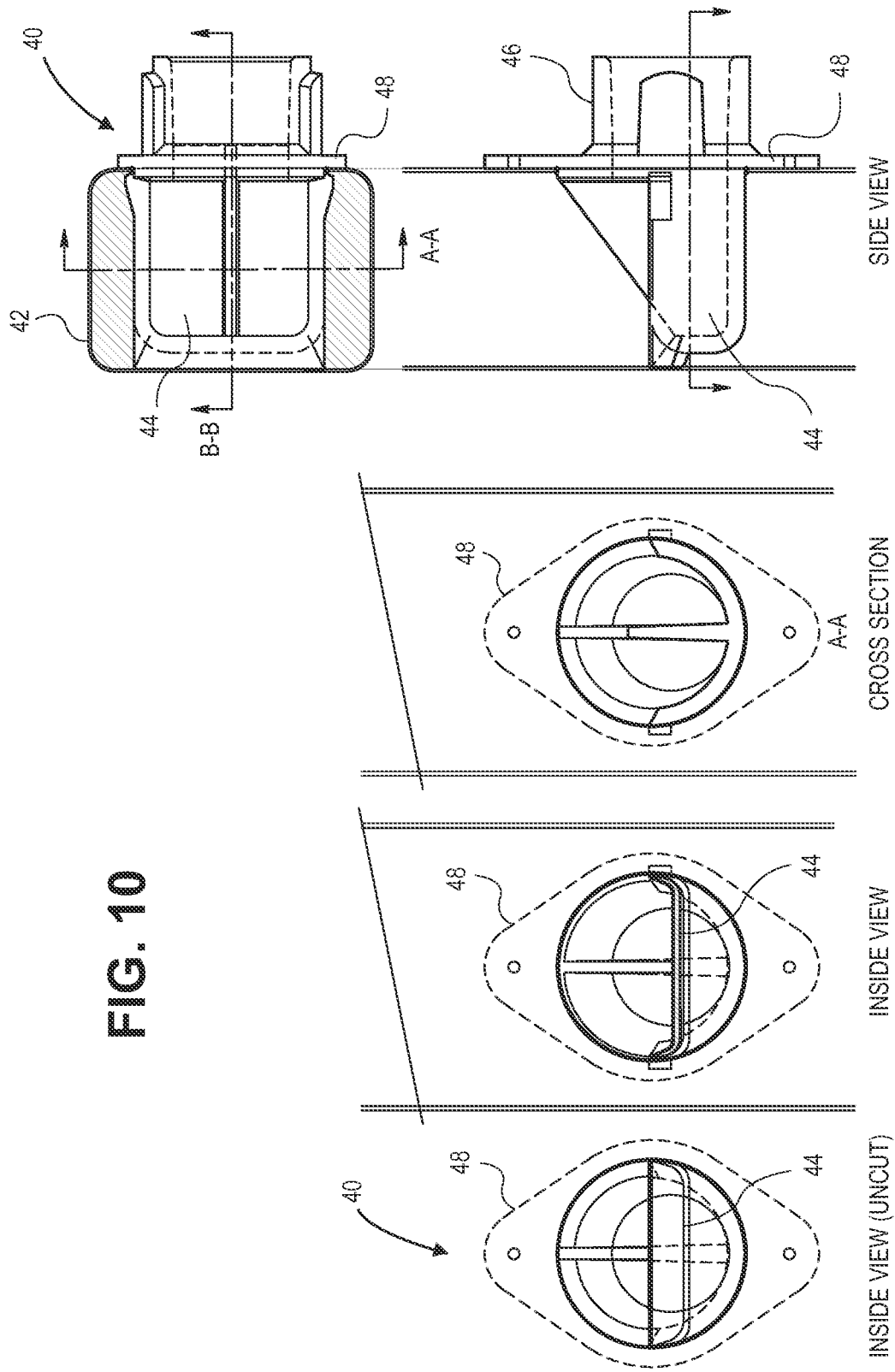
FIG. 10 are views of a diverter for use with a suitable rain barrel according to an embodiment of the invention.

FIG. 10 are views of a diverter 40 for use with a suitable rain barrel according to an embodiment of the invention. As shown in FIG. 10, the diverter 40 is configured for attachment to a gutter downspout 42. In this regard, the diverter 40 includes a scoop 44 configured to fit within the gutter downspout 42 and divert at least a portion of water passing therethrough to a barrel fitting 46. The diverter 40 further includes a flange 48 to facilitate securing the diverter 40 to the gutter downspout 42.

Figure 11:
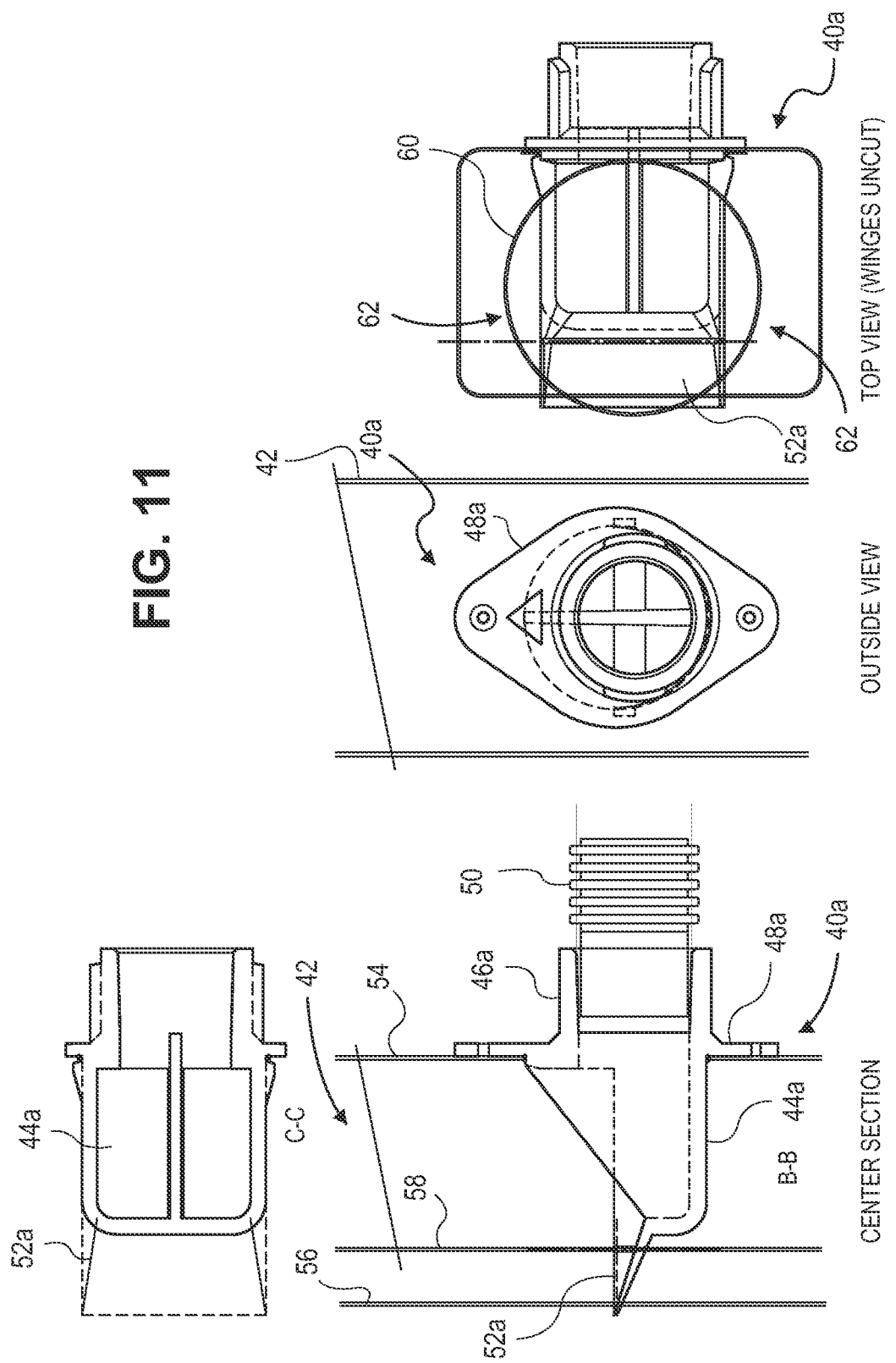
FIG. 11 are views of a diverter according to another embodiment of the invention.

FIG. 11 are views of a diverter 40a according to another embodiment of the invention. As shown in FIG. 11, the diverter 40a optionally includes a conduit or hose 50 to fluidly connect the diverter 40a to the rain barrel 10. In this regard, the diverter 40a may be in direct fluid connection with the rain barrel 10 and/or indirect fluid connection. For example, the barrel fitting 46a may be directly installed in the diverter attachment cutout 12. In another example, the hose 50 may fluidly connect the barrel fitting 46a to the diverter attachment cutout 12.

Also shown in FIG. 11, the scoop 44a may include extensions or wings 52a to accommodate various downspout configurations. In this regard, the flange 48a is shown attached to a first wall 54 of the gutter downspout 42 and the wing 52a is of sufficient length to contact a second wall of a large rectangular downspout 56. While the wing 52a is shown extending past the second wall of a large rectangular downspout 56, in use, the wing is flexible or pliable in nature and thus, the wing would slightly deform and form a seal upon the second wall of a large rectangular downspout 56. For smaller rectangular downspouts, the wing 52a may be cut as shown in FIG. 11 to fit within a second wall of a small rectangular downspout 58. Also shown in FIG. 11, the wing 52a may be trimmed to fit within a round downspout 60.

The diverter 40a is configured to allow water to flow past the scoop 44a in response to the rain barrel 10 being filled with rain above a level of the diverter attachment cutout 12. In this regard, the scoop 44a of the embodiment shown in FIG. 11 is configured to be relatively narrower than the gutter downspout 42. As such, in response to the rain barrel 10 being relatively full of water, excess water may spill over the sides of the scoop 44a and continue along the gutter downspout 42. Specifically, one or more open areas 62 may provide overflow capability to allow excess water to continue along the gutter downspout 42.

Figure 12:
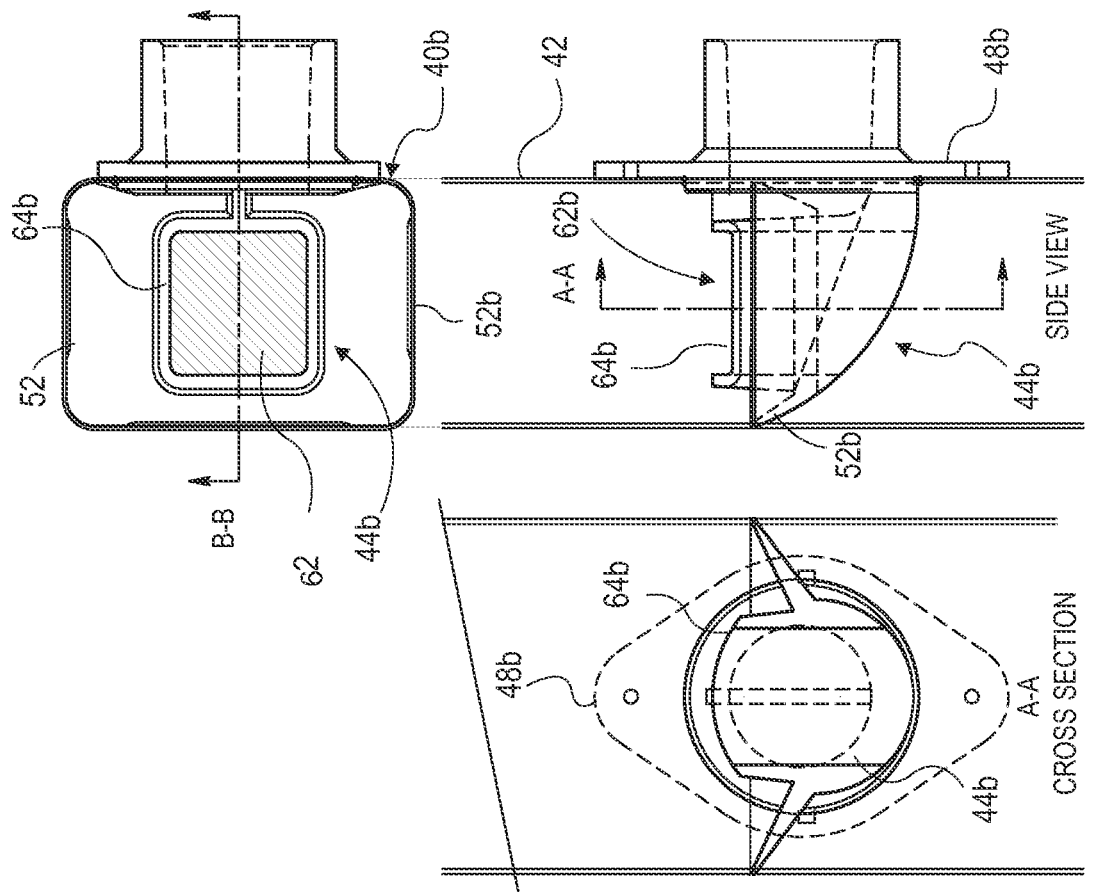
FIG. 12 are views of a diverter according to another embodiment of the invention.

FIG. 12 are views of a diverter 40b according to another embodiment of the invention. As shown in FIG. 12, the wings 52b are shown disposed at the sides of the scoop 44b and the open area 62 is disposed relatively in the middle of the scoop 44b. A lip 64b of the open area 62 is disposed relatively higher than the wing 52b. As such, water flowing down the gutter downspout 42 is diverter by the wings 52b and into the scoop 44b until the water level in the rain barrel 10 exceeds the level of the lip 64b. At which point, excess water flows over the lip 64b and into the open area 62 to continue flowing down the gutter downspout 42.

FIG. 13 are views of the diverter 40b according to the embodiment of FIG. 12. As shown in FIG. 13, the diverter 40b may be installed/removed by rotating the diverter 40b into a hole made in the gutter downspout 42.

Figure 14:
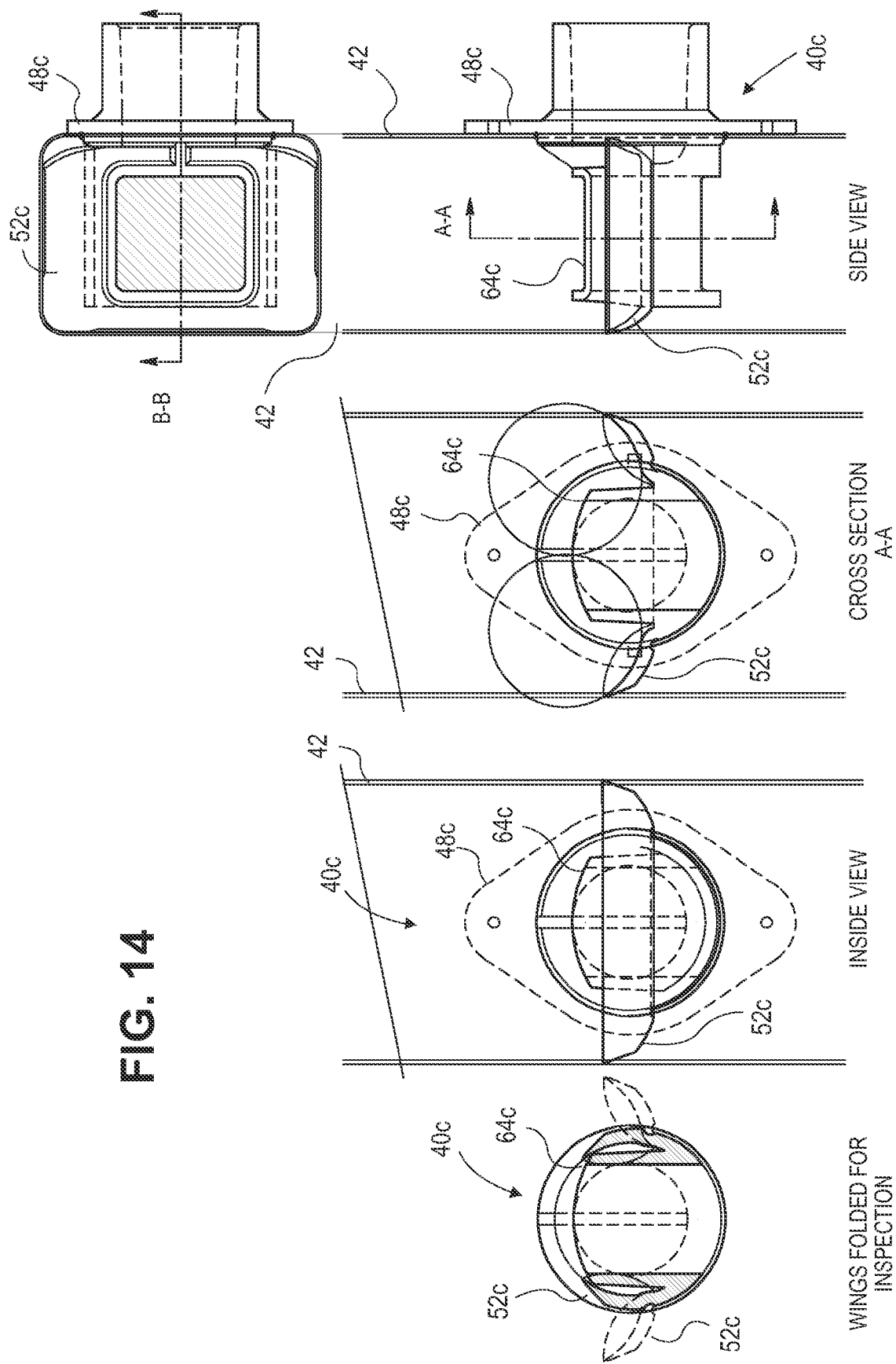
FIG. 14 are views of a diverter according to yet another embodiment of the invention.

FIG. 14 are views of a diverter 40c according to yet another embodiment of the invention. As shown in FIG. 14, the diverter 40c may be configured such that the wings 52c fold compactly inward to facilitate insertion into the gutter downspout 42.

Figure 15:
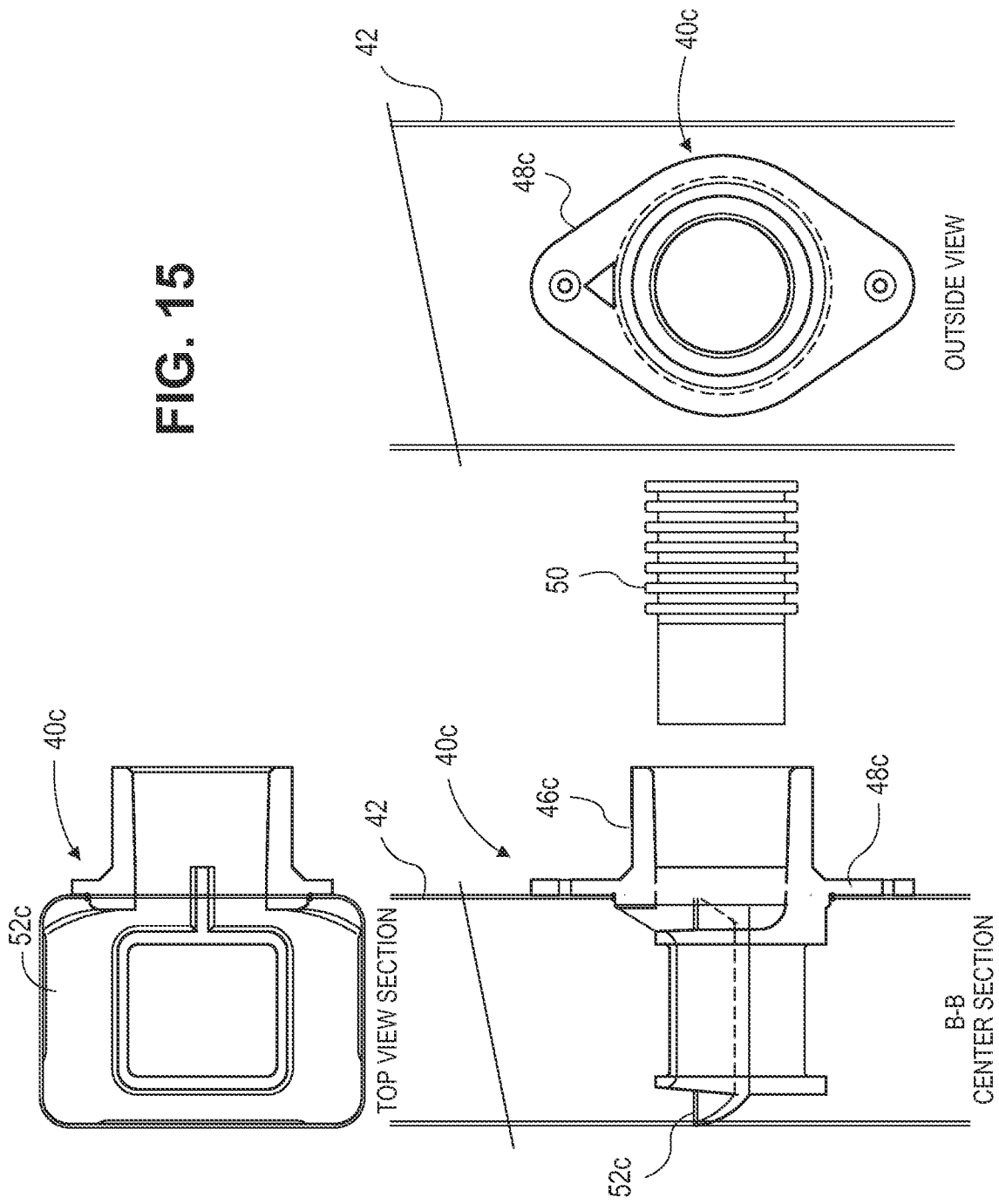
FIG. 15 are views of the diverter according to the embodiment of FIG. 14.

FIG. 15 are views of the diverter 40c according to the embodiment of FIG. 14. As shown in FIG. 15, the hose 50 may be detachably secured to the barrel fitting 46c.

Figure 16:
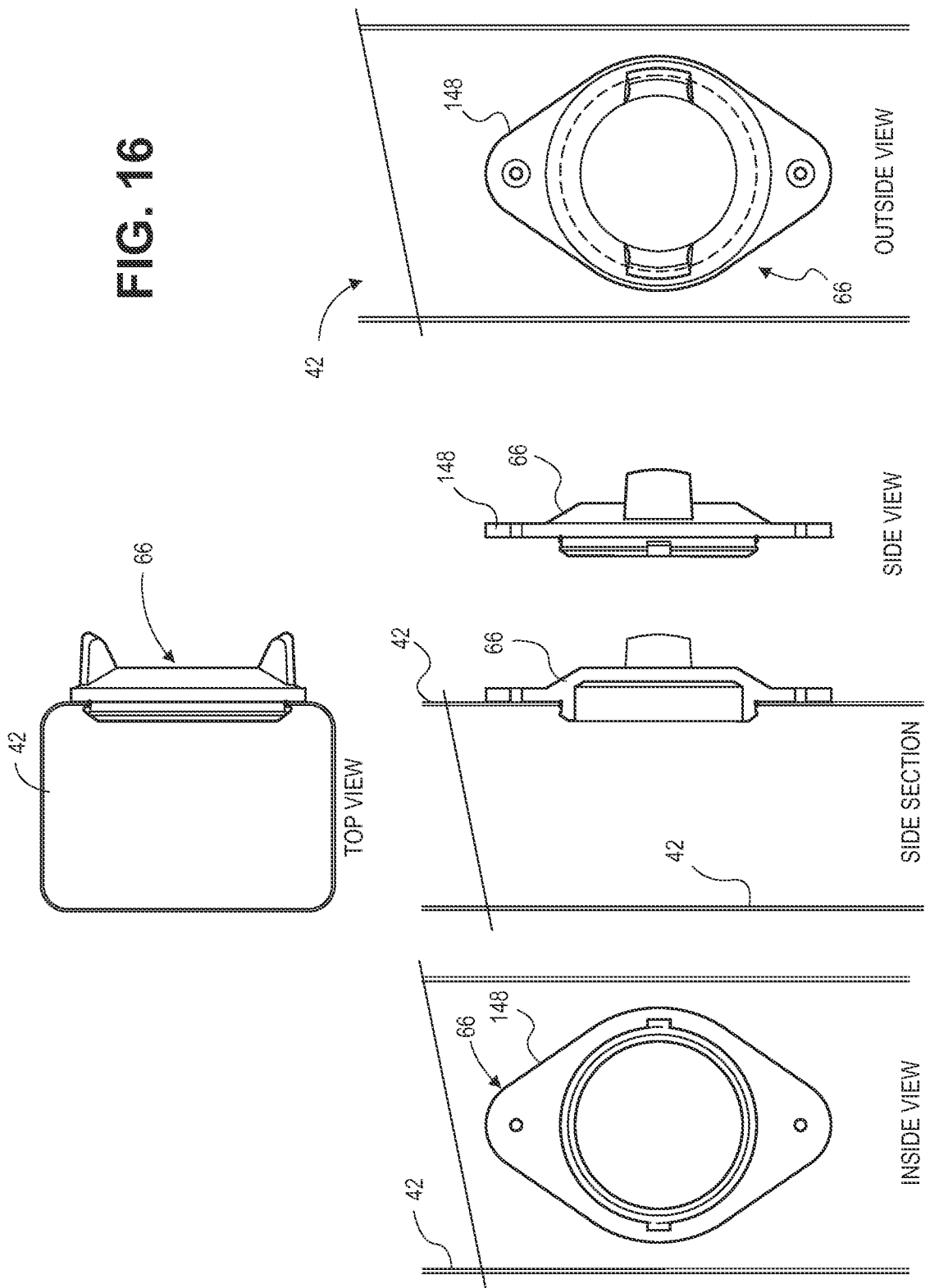
FIG. 16 are views of a downspout plug according to an embodiment of the invention.

FIG. 16 are views of a downspout plug 66 according to an embodiment of the invention. As shown in FIG. 16, a downspout plug 66 may be used to cover the hole in the gutter downspout 42. For example, if the diverter 40 is seasonally removed during winter, the downspout plug 66 may be installed to facilitate proper function of the gutter downspout 42 and or for aesthetic reasons.

Figure 17:
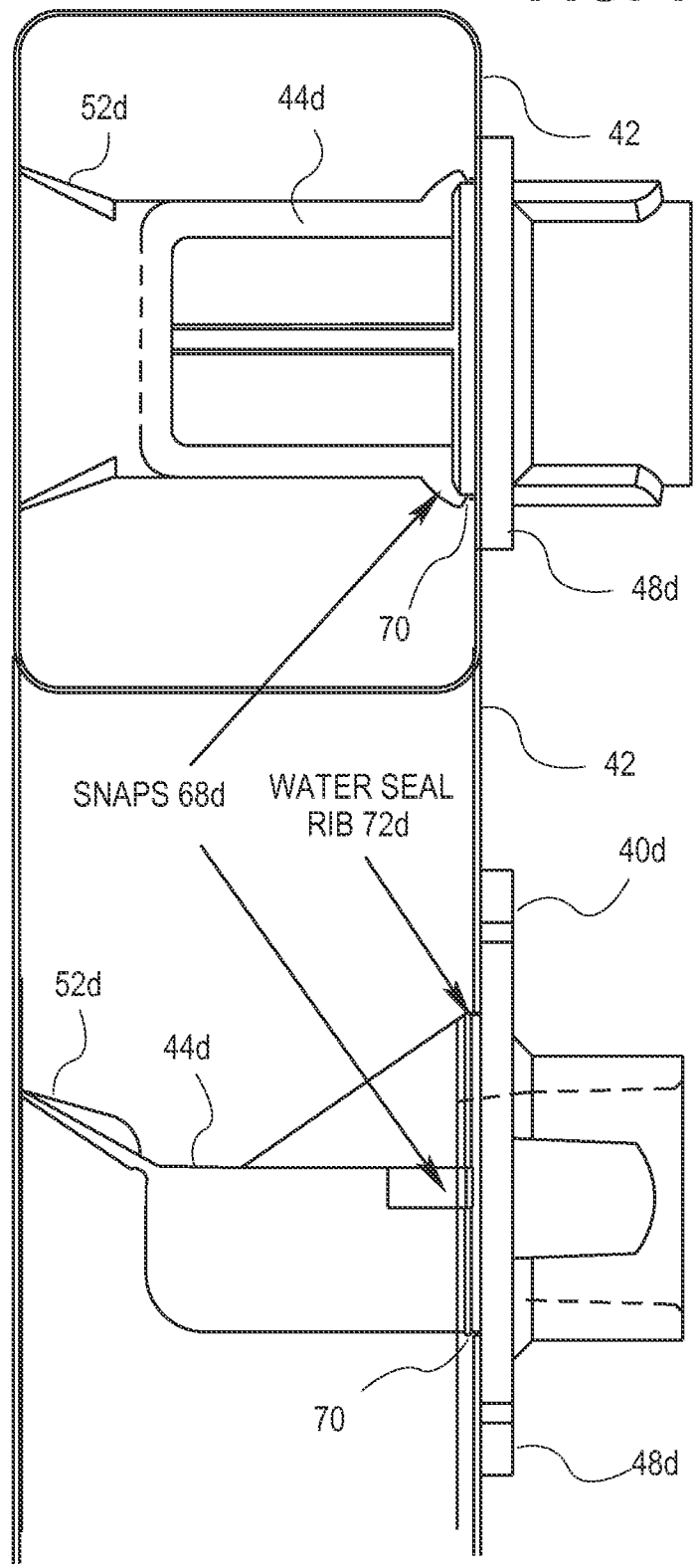
FIG. 17 are views of a diverter according to yet another embodiment of the invention.

FIG. 17 are views of a diverter 40d according to yet another embodiment of the invention. As shown in FIG. 17, the diverter 40d may include snaps 68d to facilitate securing the diverter 40d to the gutter downspout 42 without additional fasteners or to augment other such fasteners. The snaps 68d may be configured to urge against an inner wall 70 of the gutter downspout 42 to retain the diverter 40d in the gutter downspout 42. In addition, the diverter 40d may include a water seal rib 72d configured to form a seal against the inner wall 70. In this manner, water leakage is reduced or eliminated between the flange 48d and the gutter downspout 42.

Figure 18:
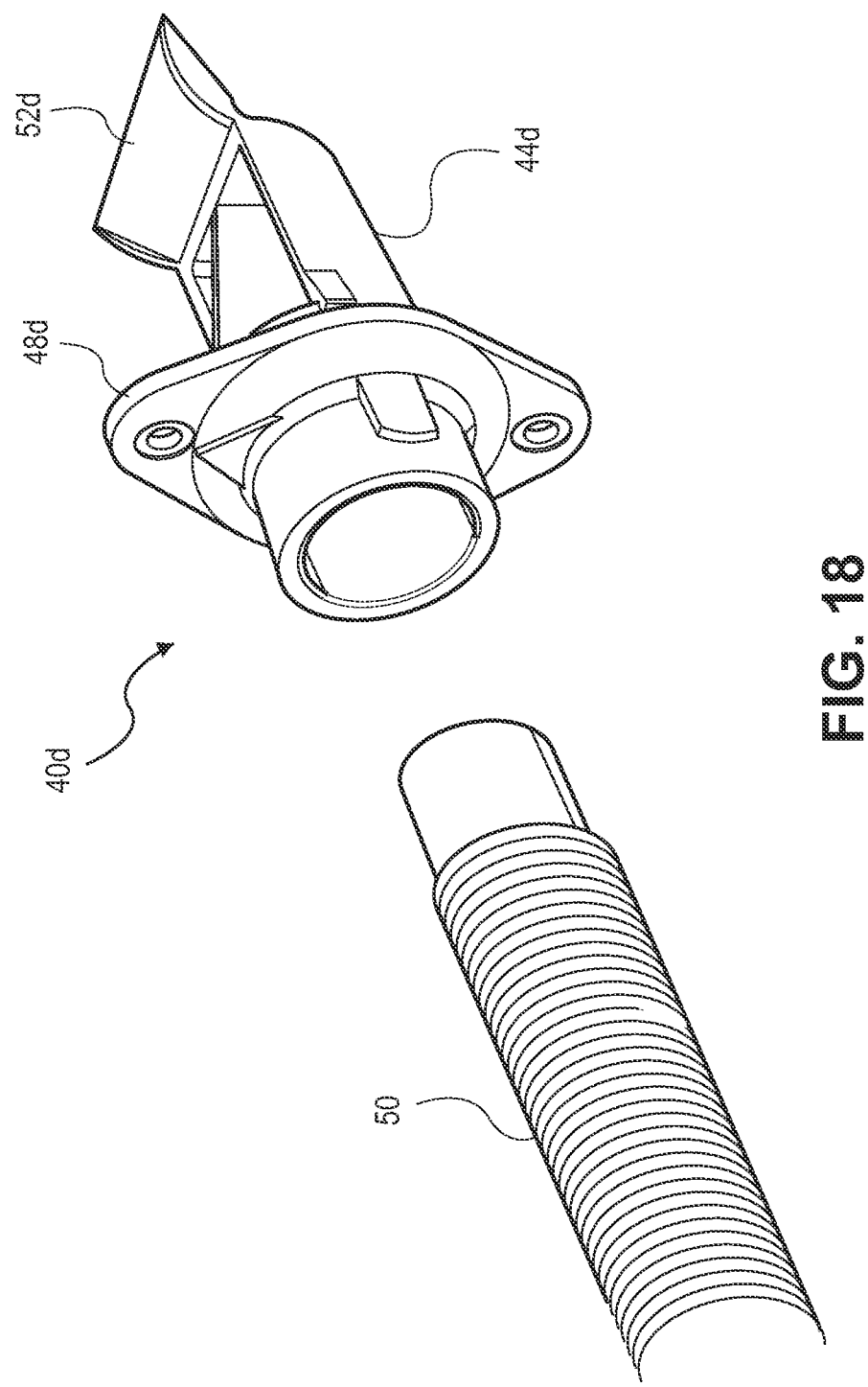
FIG. 18 is a perspective view of a hose and diverter according to the embodiment of FIG. 17.

FIG. 18 is a perspective view of the hose 50 and diverter 40d according to the embodiment of FIG. 17. As shown in FIG. 18, the hose 50 may be releasably secured to the diverter 40d.

Figure 19:
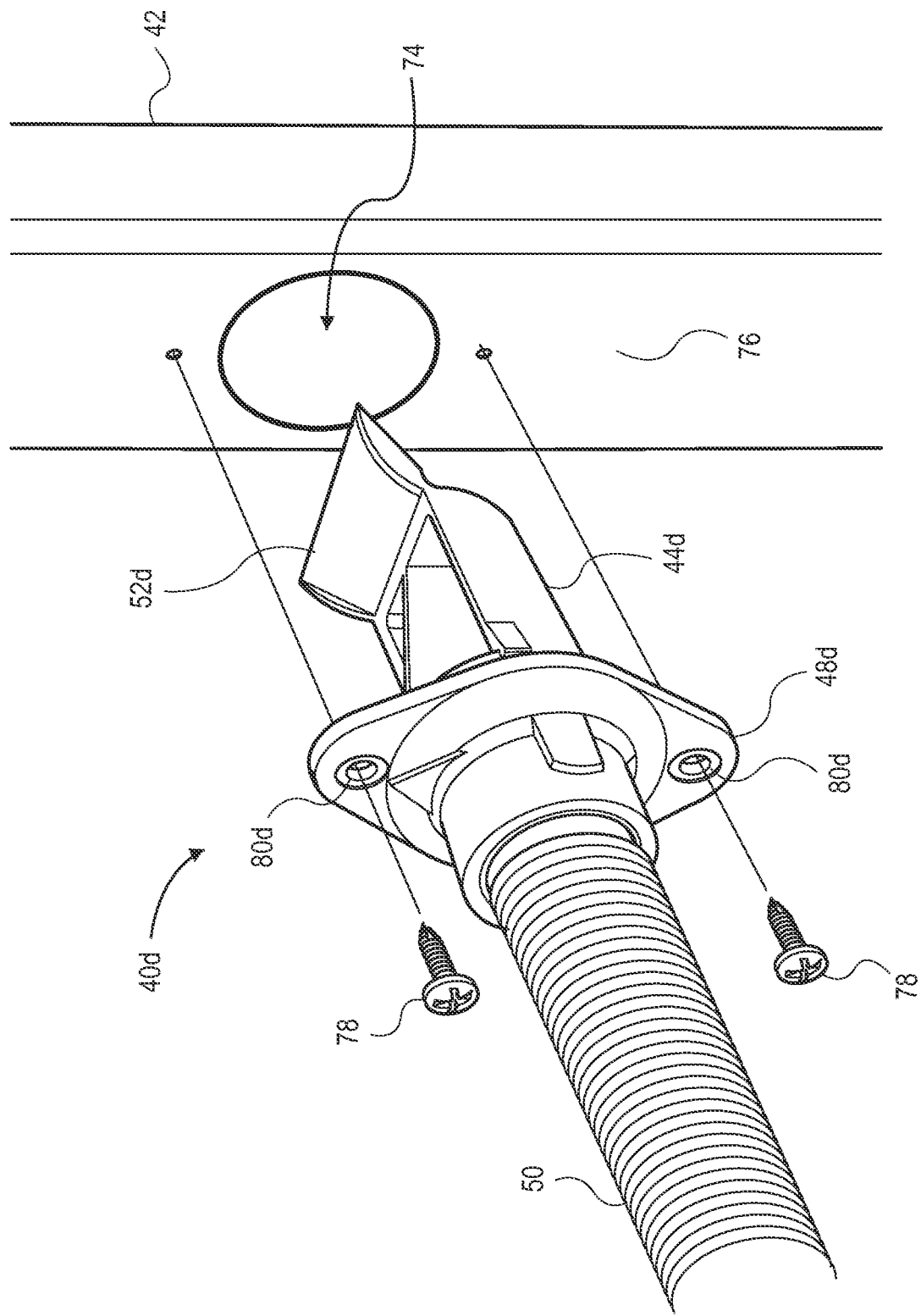
FIG. 19 is a perspective view of the hose and diverter according to the embodiment of FIG. 17 being installed in a suitable gutter downspout.

FIG. 19 is a perspective view of the hose 50 and diverter 40d according to the embodiment of FIG. 17 being installed in the gutter downspout 42. As shown in FIG. 14, the diverter 40d may be secured to the gutter downspout 42. In a particular example, the wing 52d and scoop 44d may be inserted into a hole 74 in the gutter downspout 42. The flange 48d may be affixed to an exterior surface 76 of the gutter downspout 42 via one or more fasteners 78. In a particular example, the fasteners 78 include screws configured to pass through mounting holes 80d in the flange 48d and threadedly engage the gutter downspout 42.

Figure 20:
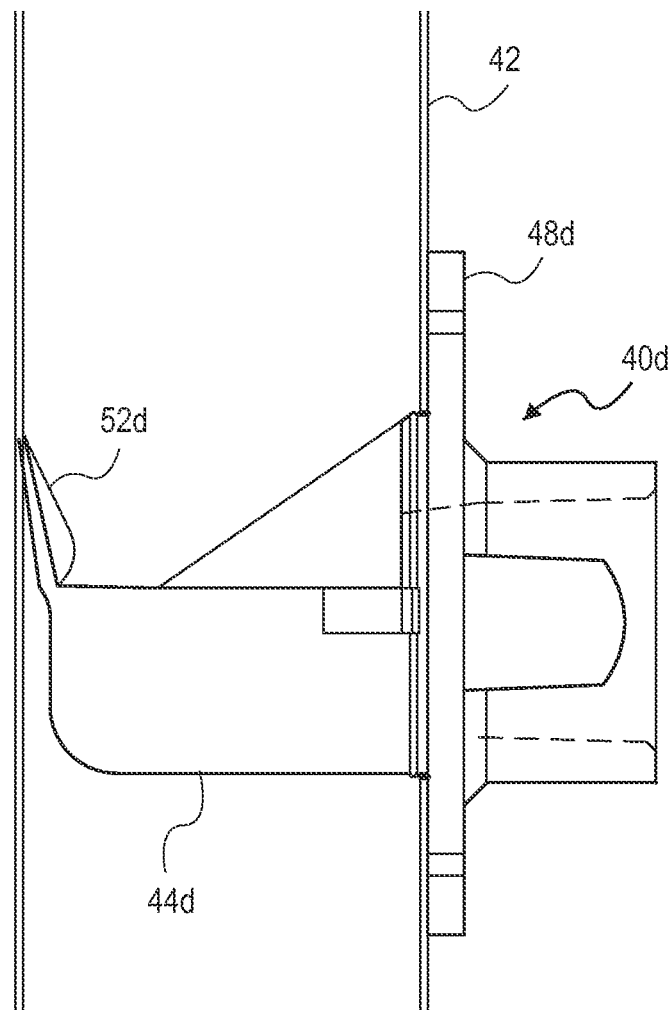
FIG. 20 is a side view of the diverter according to the embodiment of FIG. 17.

FIG. 20 is a side view of the diverter 40d according to the embodiment of FIG. 17. As shown in FIG. 20, the wing 52d may be configured to pivot to accommodate a relatively small gutter downspout 42 such as, for example, a 2 inch by 3 inch profile gutter downspout.

Figure 21:
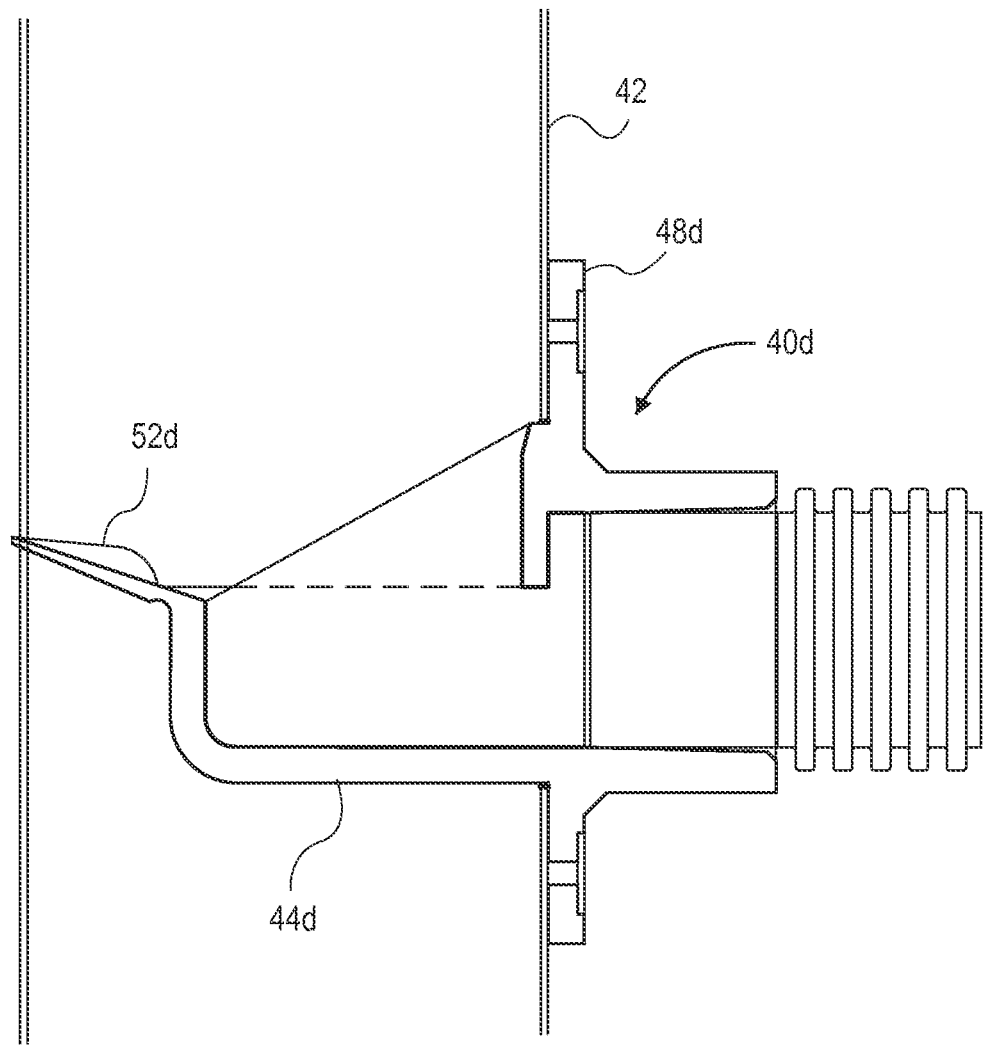
FIG. 21 is a side view of the diverter according to the embodiment of FIG. 17.

FIG. 21 is a side view of the diverter 40d according to the embodiment of FIG. 17. As shown in FIG. 21, the wing 52d may be configured to pivot to accommodate a relatively large gutter downspout 42 such as, for example, a 3 inch by 4 inch profile gutter downspout.

Figure 22:
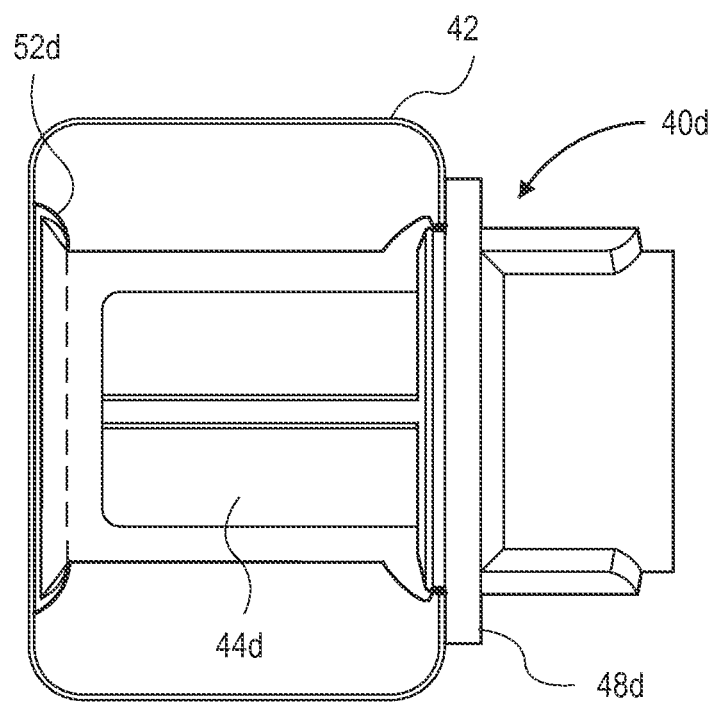
FIG. 22 is a top view of the diverter according to the embodiment of FIG. 17.

FIG. 22 is a top view of the diverter 40d according to the embodiment of FIG. 17. As shown in FIG. 22, the wing 52d may be configured to pivot to accommodate a relatively small gutter downspout 42 such as, for example, a 2 inch by 3 inch profile gutter downspout.

Figure 23:
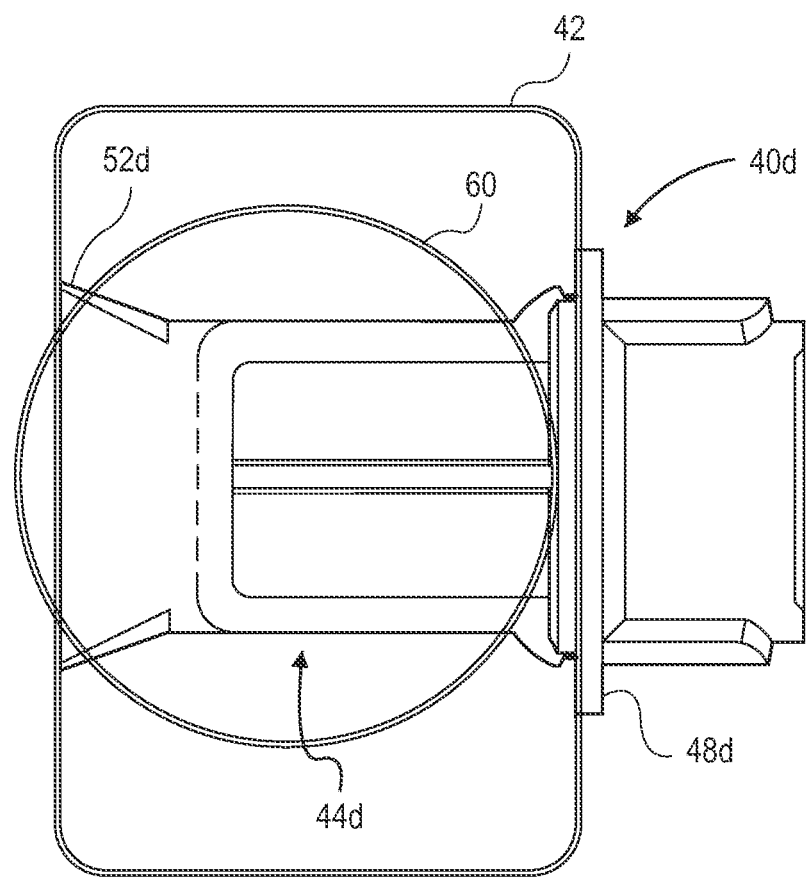
FIG. 23 is a top view of the diverter according to the embodiment of FIG. 17.

FIG. 23 is a top view of the diverter 40d according to the embodiment of FIG. 17. As shown in FIG. 23, the wing 52d may be configured to pivot to accommodate a relatively large gutter downspout 42 such as, for example, a 3 inch by 4 inch profile gutter downspout and/or a round gutter downspout 60.

Figure 24:
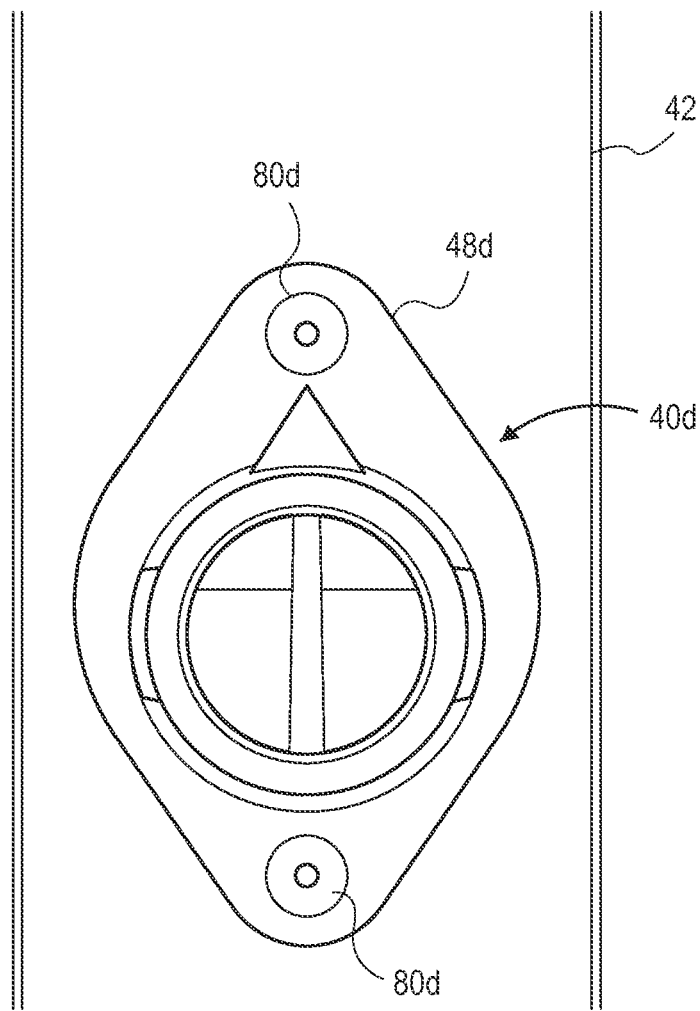
FIG. 24 is a front view of the diverter installed in a suitable gutter downspout according to the embodiment of FIG. 17.

FIG. 24 is a front view of the diverter 40d installed in a suitable gutter downspout 42 according to the embodiment of FIG. 17.

Figure 25:
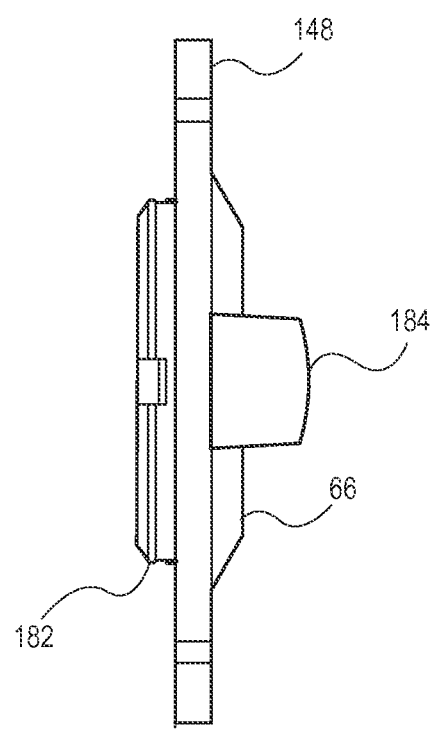
FIG. 25 is a side view of a downspout plug suitable for plugging a hole for use with the diverter according to the embodiment of FIG. 17.

FIG. 25 is a side view of the downspout plug 66 suitable for plugging the hole 74 for use with the diverter 40d according to the embodiment of FIG. 17. As shown in FIG. 25, the downspout plug 66 includes a retaining rib 182 to facilitate retaining the downspout plug 66 in the hole 74. In addition, the downspout plug 66 may include squeeze tabs 184 to facilitate removing the downspout plug 66 from the gutter downspout 42.

Figure 26:
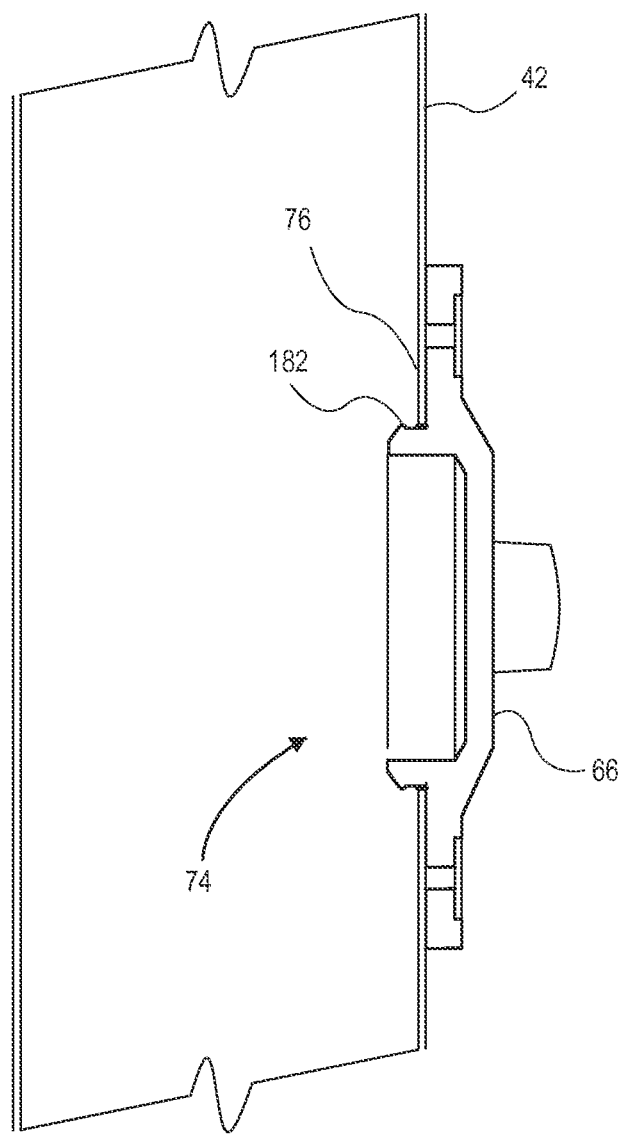
FIG. 26 is a side, cross sectional view of a downspout plug suitable for plugging a hole for use with the diverter according to the embodiment of FIG. 17.

FIG. 26 is a side, cross sectional view of a downspout plug 66 suitable for plugging the hole 74 for use with the diverter 40d according to the embodiment of FIG. 17. As shown in FIG. 26, the retaining rib 182 is configured to retain the downspout plug 66 in the hole 74.

Figure 27:
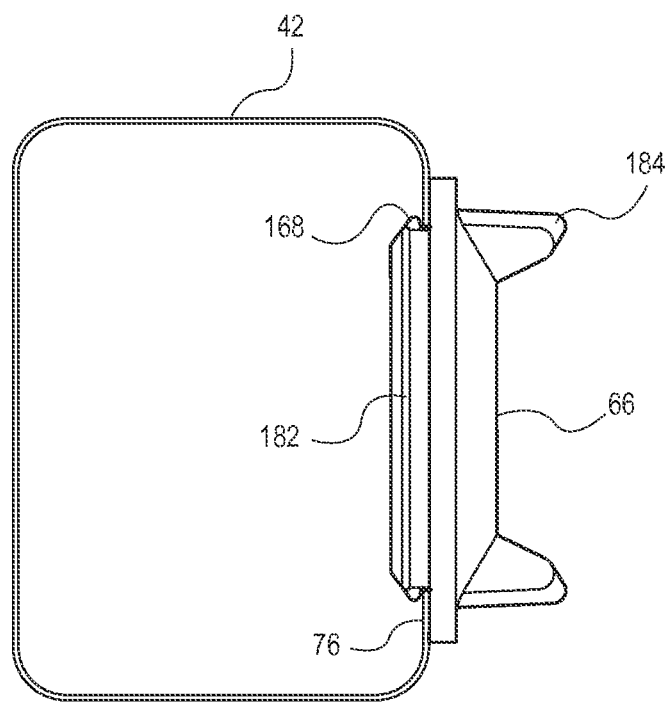
FIG. 27 is a top cut away view of a downspout plug suitable for plugging a hole for use with the diverter according to the embodiment of FIG. 17.

FIG. 27 is a top cut away view of a downspout plug 66 suitable for plugging the hole 74 for use with the diverter 40d according to the embodiment of FIG. 17. As shown in FIG. 27, the retaining rib 182 is configured to retain the downspout plug 66 in the hole 74. In addition to the retaining rib 182, the downspout plug 66 may include snaps 168 to further aid in retaining the downspout plug 66 in the gutter downspout 42.

Figure 28:
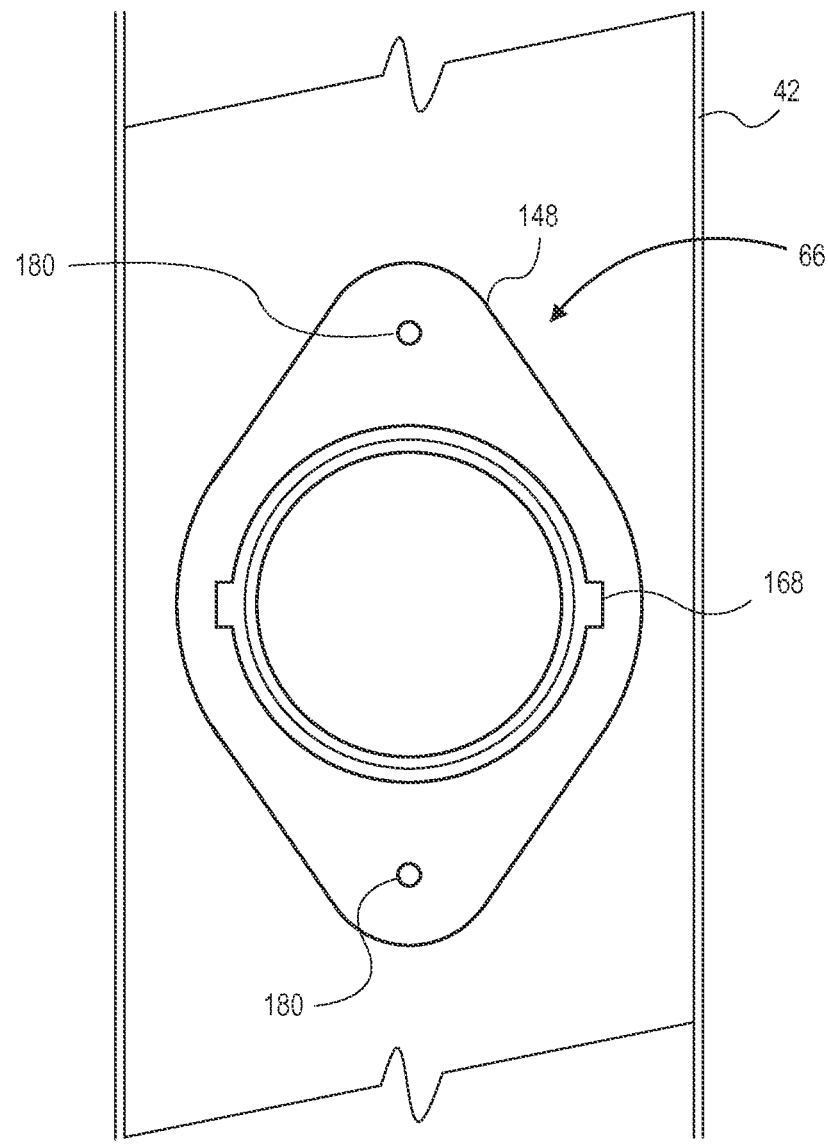
FIG. 28 is an inside view of the downspout plug suitable for plugging a hole for use with the diverter according to the embodiment of FIG. 17.

FIG. 28 is an inside view of the downspout plug 66 suitable for plugging the hole 74 for use with the diverter 40d according to the embodiment of FIG. 17. As shown in FIG. 28, the snaps 168 may be configured to extend from the downspout plug 66.

Figure 29:
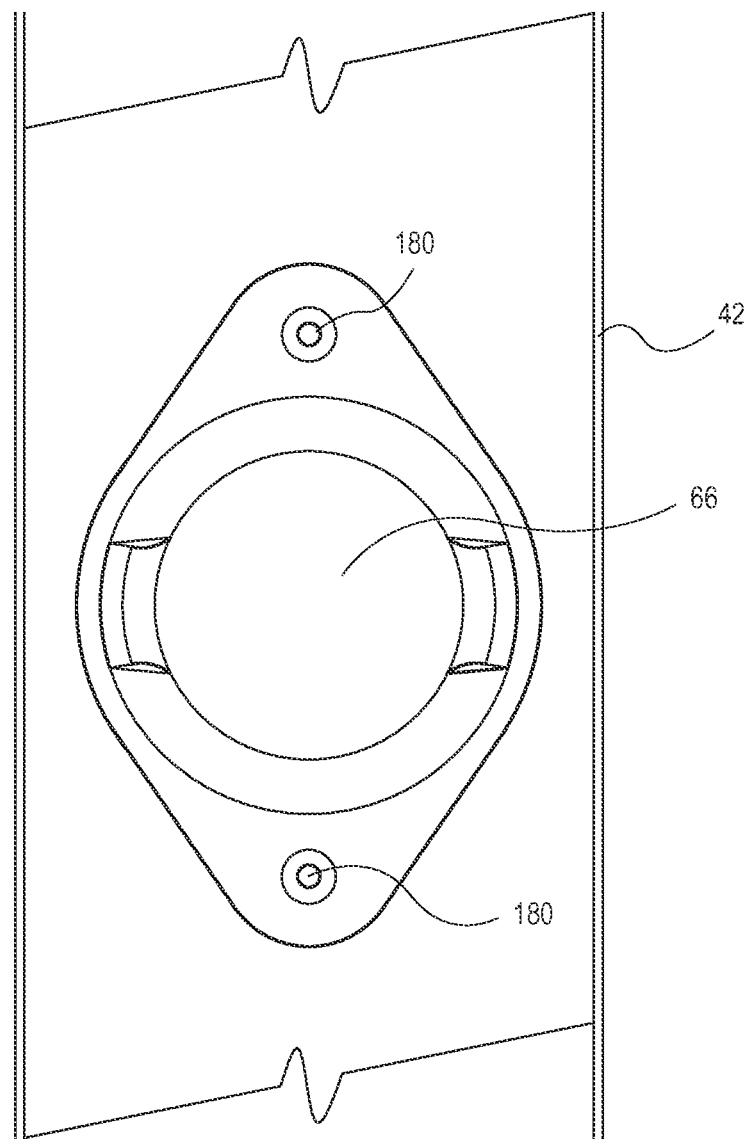
FIG. 29 is an outside view of the downspout plug suitable for plugging a hole for use with the diverter according to the embodiment of FIG. 17.

FIG. 29 is an outside view of the downspout plug 66 suitable for plugging the hole 74 for use with the diverter 40d according to the embodiment of FIG. 17. As shown in FIG. 29, the downspout plug 66 may include mounting holes 180 configured to match the location of the mounting holes 80d on the diverter 40d.

Figure 30:
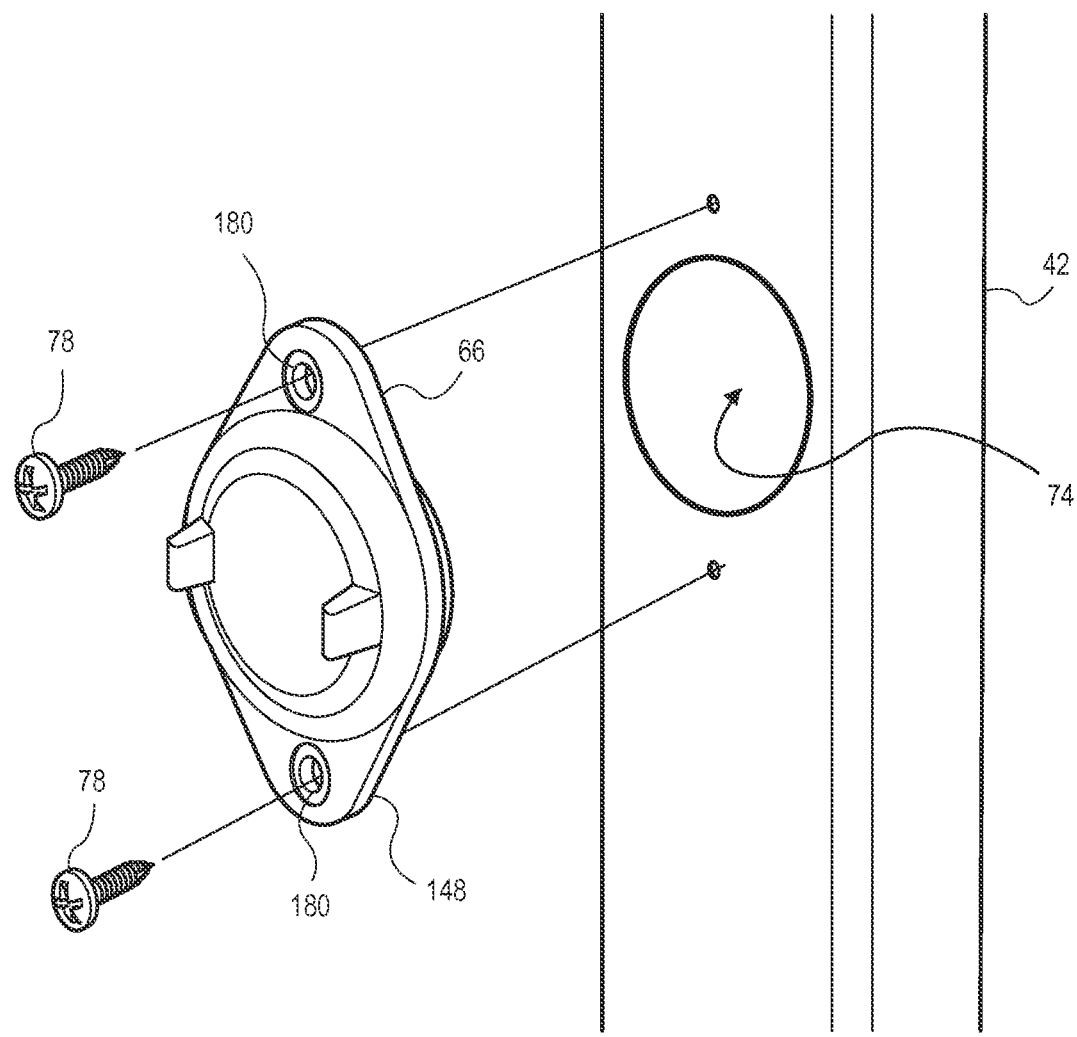
FIG. 30 is an exploded perspective view of the downspout plug suitable for plugging a hole for use with the diverter according to the embodiment of FIG. 17.

FIG. 30 is an exploded perspective view of the downspout plug 66 suitable for plugging the hole 74 for use with the diverter 40d according to the embodiment of FIG. 17.

Figure 31:
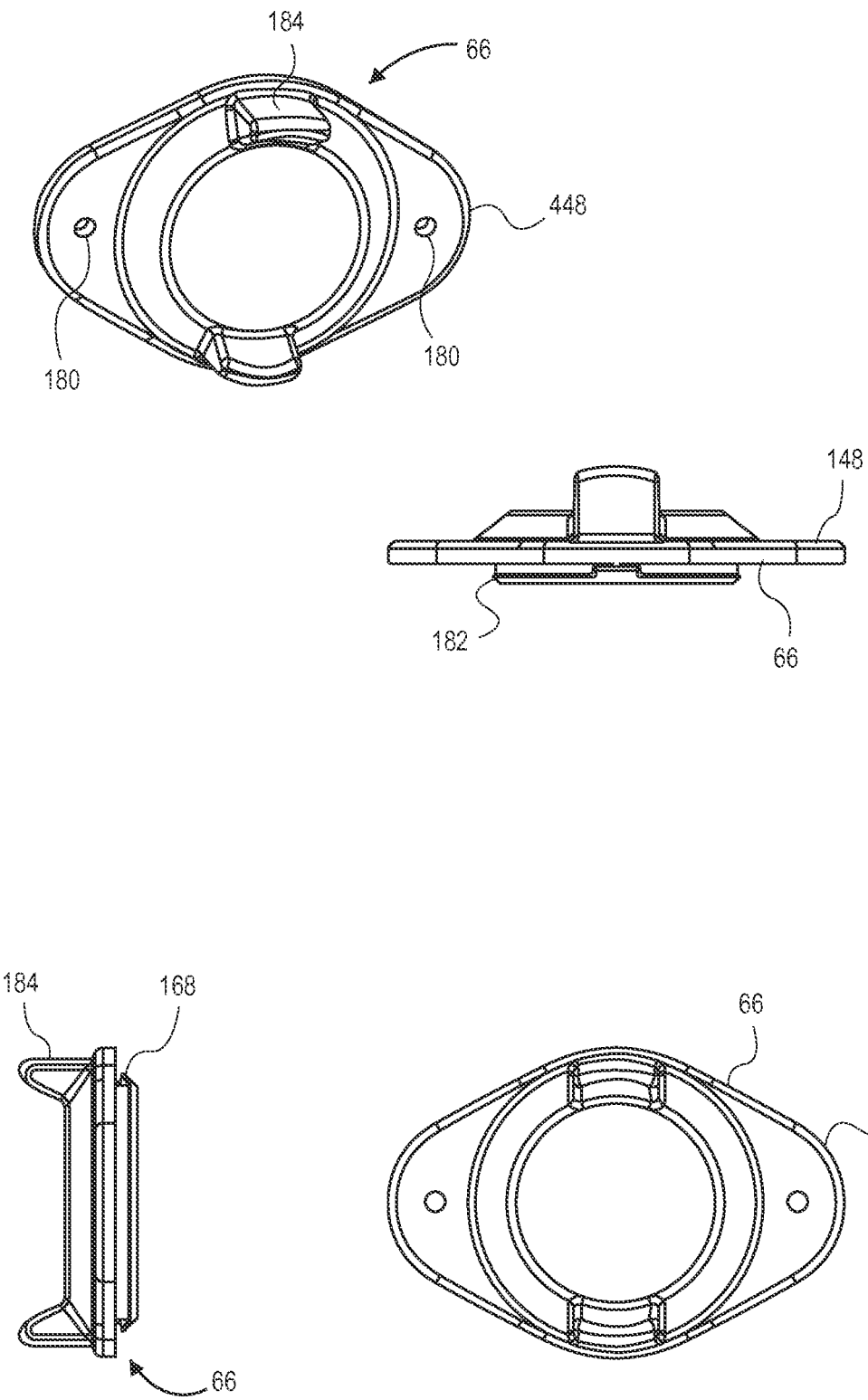
FIG. 31 are views of the downspout plug suitable for plugging a hole for use with the diverter according to the embodiment of FIG. 17.

FIG. 31 are views of the downspout plug 66 suitable for plugging the hole 74 for use with the diverter 40d according to the embodiment of FIG. 17.

Figure 32:
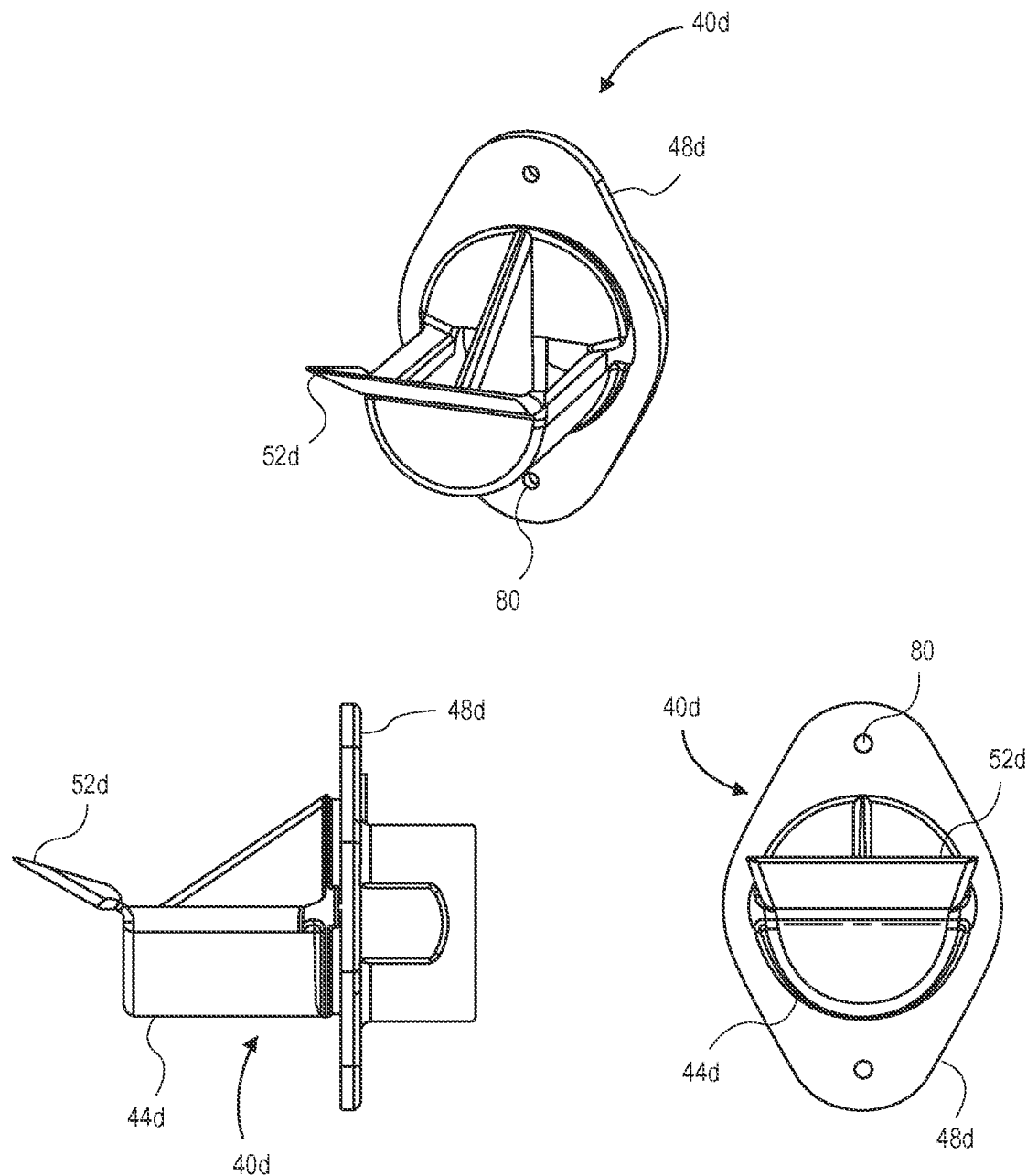
FIG. 32 are views of the diverter according to the embodiment of FIG. 17.
Figure 33:
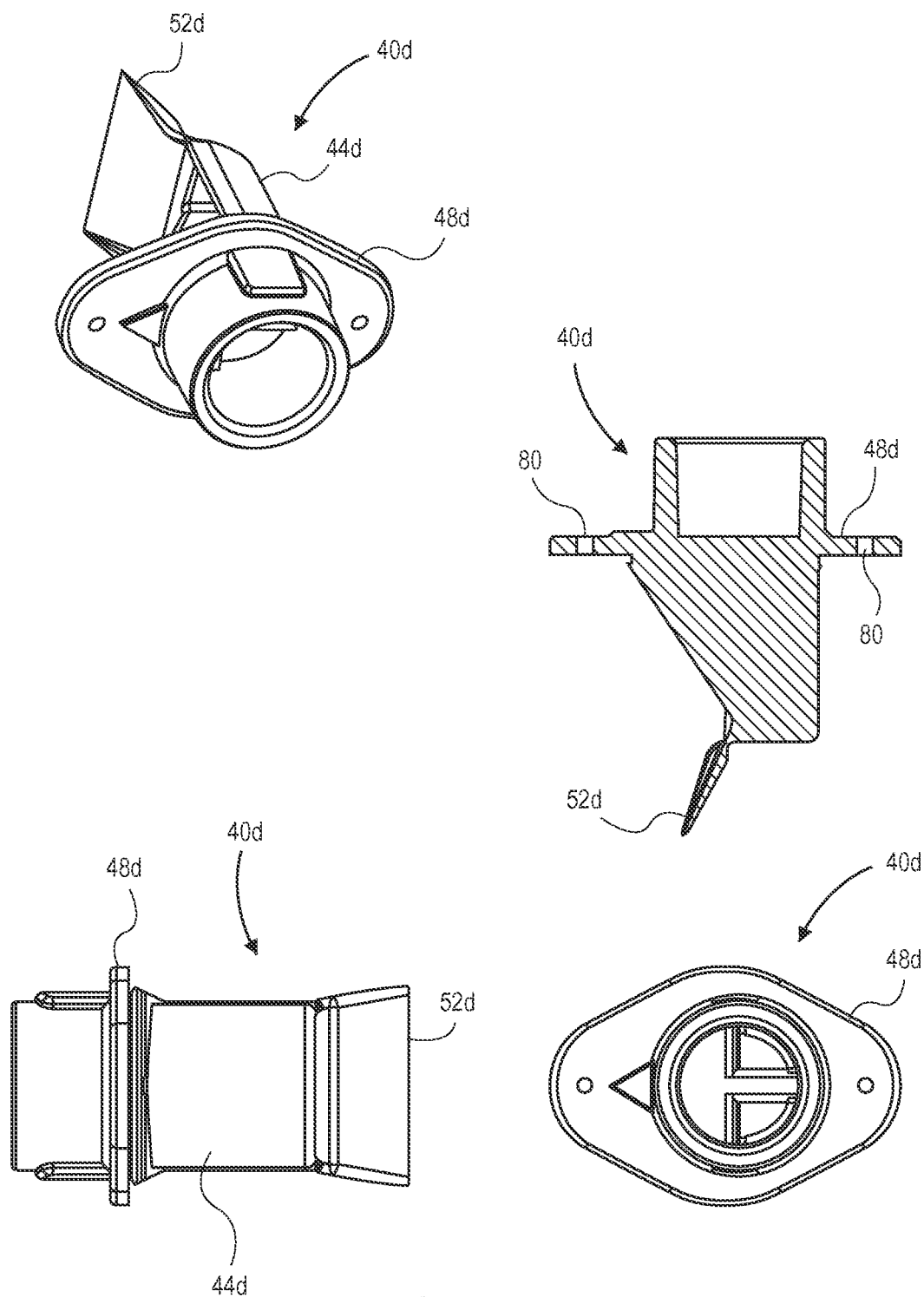
FIG. 33 are views of the diverter according to the embodiment of FIG. 17.

FIGS. 32 and 33 are views of the diverter 40d according to the embodiment of FIG. 17.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diverter for a rain barrel, the diverter comprising:
   a scoop portion configured to fit within a gutter downspout;
   a rain barrel fitting portion configured to fluidly attach the scoop portion to the rain barrel, said rain barrel fitting portion defining a flow channel through the diverter out of the gutter downspout;
   the scoop portion comprising one or more wings comprising a flexible material operable to be folded into a first conformation for insertion into a hole disposed in the side of the gutter downspout, each wing having a wing lip portion extending outwardly in a second conformation to contact an inner wall of the gutter downspout to direct a first flow of water in the gutter downspout into the scoop portion and thereafter through the rain barrel fitting portion and flow channel through the diverter out of the gutter downspout; and
   the scoop portion further defining an open area to allow excess water to continue along the gutter downspout past the diverter, the open area being permanently open to a second flow of water that is fluidly independent from the flow channel.

2. The diverter of claim 1, wherein the diverter comprises a hose to fluidly couple the diverter to the rain barrel.

3. The diverter of claim 1, wherein the wing comprises a material which can be cut to couple with the gutter downspout.

4. The diverter of claim 1, wherein the wing is configured to fold in to couple with the gutter downspout.

5. The diverter of claim 1, further comprising fasteners to couple the diverter to the gutter downspout.

* * * * *